US012548886B2

(12) United States Patent
Jeon

(10) Patent No.: US 12,548,886 B2
(45) Date of Patent: Feb. 10, 2026

(54) ELECTRONIC DEVICE COMPRISING ANTENNA

(71) Applicant: Samsung Electronics Co., Ltd., Suwon-si (KR)

(72) Inventor: Jaewoong Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 18/335,760

(22) Filed: Jun. 15, 2023

(65) Prior Publication Data

US 2023/0327325 A1    Oct. 12, 2023

Related U.S. Application Data

(63) Continuation of application No. PCT/KR2022/000295, filed on Jan. 7, 2022.

(30) Foreign Application Priority Data

Jan. 14, 2021    (KR) .................. 10-2021-0005453

(51) Int. Cl.
*H01Q 1/24* (2006.01)
*H01Q 1/44* (2006.01)
(Continued)

(52) U.S. Cl.
CPC .............. *H01Q 1/243* (2013.01); *H01Q 1/44* (2013.01); *H01Q 1/48* (2013.01); *H01Q 9/0442* (2013.01);
(Continued)

(58) Field of Classification Search
CPC .................................................. H01Q 1/243
See application file for complete search history.

(56) References Cited

U.S. PATENT DOCUMENTS 6,574,862 B1    6/2003  Choi et al.
10,419,050 B1*  9/2019  Cetinoneri ............... H03H 7/38
(Continued)

FOREIGN PATENT DOCUMENTS

KR    2019-0030311 A    3/2019
KR    20190029215 A     3/2019
(Continued)

OTHER PUBLICATIONS

International Search Report for PCT/KR2022/000295 mailed May 4, 2022, 5 pages.
(Continued)

*Primary Examiner* — Awat M Salih
(74) *Attorney, Agent, or Firm* — Nixon & Vanderhye P.C.

(57) ABSTRACT

An electronic device according to various embodiments comprises: a first printed circuit board (PCB); a second PCB disposed to be spaced apart from the first PCB; an interposer encompassing the space between the first PCB and the second PCB; an antenna; a conductive connecting member comprising a conductive material electrically connecting the second PCB and the antenna; and a wireless communication circuit electrically connected to the first PCB, wherein the interposer includes a ground portion configured to provide shielding for least one electronic component disposed in the electronic device, and a non-conductive portion positioned to be adjacent the ground portion and including a dielectric material, the non-conductive portion of the interposer includes a conductive via configured to connect the first PCB and the second PCB, and the wireless communication circuit is configured to transmit and/or receive a signal having a designated frequency band by feeding electricity to the antenna through the conductive via.

12 Claims, 35 Drawing Sheets

(51) Int. Cl.
  *H01Q 1/48* (2006.01)
  *H01Q 9/04* (2006.01)
  *H05K 1/02* (2006.01)
  *H05K 1/11* (2006.01)
  *H05K 1/14* (2006.01)

(52) U.S. Cl.
  CPC ........... *H05K 1/0243* (2013.01); *H05K 1/115* (2013.01); *H05K 1/14* (2013.01); *H05K 2201/10098* (2013.01)

(56) References Cited

U.S. PATENT DOCUMENTS

| | | |
|---|---|---|
| 2012/0243195 A1 | 9/2012 | Lim et al. |
| 2014/0203982 A1 | 7/2014 | Seo et al. |
| 2017/0085000 A1 | 3/2017 | Girard |
| 2019/0081404 A1 | 3/2019 | Jeon et al. |
| 2019/0082536 A1 | 3/2019 | Park et al. |
| 2019/0288402 A1 | 9/2019 | Rashidian |
| 2019/0313529 A1 | 10/2019 | Kim et al. |
| 2019/0327834 A1 | 10/2019 | Kim et al. |
| 2020/0186180 A1 | 6/2020 | Park et al. |
| 2020/0296833 A1* | 9/2020 | Park .................... G06F 1/1656 |
| 2020/0337188 A1 | 10/2020 | Yun et al. |
| 2020/0344869 A1 | 10/2020 | So et al. |
| 2022/0005757 A1 | 1/2022 | Oh et al. |

FOREIGN PATENT DOCUMENTS

| | | | |
|---|---|---|---|
| KR | 20190038264 A | 4/2019 | |
| KR | 20190125461 A | 11/2019 | |
| KR | 20190139597 A | 12/2019 | |
| KR | 20200032911 A | 3/2020 | |
| KR | 20200053408 A | 5/2020 | |
| KR | 20200126124 A | 11/2020 | |
| KR | 20210070618 A | 6/2021 | |
| KR | 102468136 B1 | 11/2022 | |
| WO | WO-2019235731 A1 * | 12/2019 | ............... H01Q 1/38 |

OTHER PUBLICATIONS

Written Opinion of the ISA for PCT/KR2022/000295 mailed May 4, 2022, 4 pages.
Extended European Search Report dated Apr. 11, 2024 issued in European Patent Application No. 22739584.5.
Korean Office Action dated Mar. 15, 2025 for KR Application No. 10-2021-0005453.
Korean Notice of Patent Grant dated Nov. 18, 2025 for KR Application No. 10-2021-0005453.

* cited by examiner

ELECTRONIC DEVICE COMPRISING ANTENNA

CROSS-REFERENCE TO RELATED APPLICATIONS

This application is a continuation of International Application No. PCT/KR2022/000295 designating the United States, filed on Jan. 7, 2022, in the Korean Intellectual Property Receiving Office and claiming priority to Korean Patent Application No. 10-2021-0005453, filed on Jan. 14, 2021, in the Korean Intellectual Property Office, the disclosures of which are incorporated by reference herein in their entireties.

BACKGROUND

Field

The disclosure relates to an electronic device including an antenna.

Description of Related Art

Recently released portable electronic devices include a plurality of printed circuit boards (PCBs) to provide various functions and support high-frequency communication. In particular, recently, an interposer method of inserting an interposer between a plurality of PCBs instead of a substrate-like PCB (SLP) in which a plurality of printed circuit boards are manufactured like a semiconductor substrate has been widely used. The interposer used in the interposer method is disposed between stacked PCBs and serves to electrically connect an upper PCB and a lower PCB, and a design using the interposer method may be advantageous in that the manufacturing cost is lower than that in the case using the SLP method.

Meanwhile, a portable electronic device may include a plurality of antennas to communicate with an external device, and the plurality of antennas may be electrically connected to a wireless communication circuit disposed on at least one PCB for power feeding. In this case, the arrangement structure and power feeding paths of the plurality of antennas and the wireless communication circuit may be provided in various ways.

In addition, in order to perform wireless communication in various frequency bands, an electronic device may include antenna radiators having various electrical lengths. For example, a side surface member disposed in a housing of an electronic device may be made of a metallic material and may operate as an antenna radiator by being fed with power from a wireless communication circuit.

In order for an electronic device to perform wireless communication, an antenna component has to be placed inside the electronic device. As the electronic device is miniaturized and the capacity of the battery increases, it may be difficult to secure a space to place an antenna component other than the space where PCBs are stacked. Due to this, the electronic device may be subject to spatial restrictions in providing power feeding paths connected to an antenna from a plurality of PCBs.

In addition, when an antenna component is disposed in the space where the PCBs are stacked, antenna radiation may be interfered with due to a metallic material disposed on the PCBs, and thus antenna performance may be deteriorated.

Additionally, in order to design each PCB to be in contact with an LDS antenna in order to connect the plurality of PCBs to the LDS antenna, it is necessary for at least a portion of an antenna carrier to have an inclination angle of 60° or more. In the case of designing the antenna carrier to have such an angle, the antenna may be vulnerable to impact and may increase manufacturing costs.

SUMMARY

Embodiments of the disclosure provide a method and device capable of feeding power to an antenna using a conductive via provided in an interposer in an electronic device including the interposer.

An electronic device according to various example embodiments may include: a first printed circuit board (PCB), a second PCB disposed apart from the first PCB, an interposer surrounding a space between the first PCB and the second PCB, an antenna, a conductive connection member comprising a conductive material electrically connecting the second PCB and the antenna, and a wireless communication circuit electrically connected to the first PCB. The interposer may include: a ground portion configured to provide shielding for at least one electronic component disposed in the electronic device, and a non-conductive portion located adjacent to the ground portion and including a dielectric material. The non-conductive portion of the interposer may include a conductive via connecting the first PCB and the second PCB, and the wireless communication circuit may be configured to transmit and/or receive a signal of a specified frequency band by feeding power to the antenna via the conductive via.

A printed circuit board assembly (PBA) according to various example embodiments may include: a first printed circuit board (PCB), a second PCB disposed apart from the first PCB, an interposer disposed between a first surface of the first PCB and a second surface of the second PCB, a first portion comprising a non-conductive material, and a second portion comprising a conductive material and different from the first portion. Conductive vias may be provided in at least a portion of the first portion, and the interposer may be connected to the first PCB via a first conductive member comprising a conductive material in the first portion and may be connected to the second PCB via a second conductive member comprising a conductive material in the first portion. When a second surface of the second PCB is viewed from a third surface of the first PCB, is the third surface of the first PCB being a surface opposite to the first surface of the first PCB, all or part of a first area of the first PCB and a second area of the second PCB corresponding to the first portion of the interposer may comprise a non-conductive material, and at least one conductive connection member comprising a conductive material electrically connected to at least one antenna may be disposed in at least a portion of the third surface of the first PCB corresponding to the first area of the first PCB.

According to various example embodiments disclosed herein, since power is fed using a conductive via provided in at least a portion of the interposer electrically connected to at least one PCB, a power feeding path can be provided in the space where the interposer is provided. In addition, since a non-conductive material is provided in an area adjacent to a conductive via provided in the interposer, deterioration of antenna performance can be prevented and/or reduced even when an antenna component is disposed in an area where the at least one PCB and the interposer overlap. Accordingly, by disposing the antenna component using only the area in which the at least one PCB is provided, an electronic device that performs wireless communication can be implemented despite a spatial restriction.

According to various example embodiments disclosed herein, by variously providing conductive vias provided in at least a portion of an interposer, impedance tuning can be performed by the electronic device.

According to various example embodiments disclosed herein, the electronic device can be designed such that an antenna carrier is resistant to an external impact by feeding power via a conductive via.

Various other effects identified directly or indirectly through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described with reference to the accompanying drawings. However, it is to be understood that the description is not intended to limit the disclosure to specific embodiments and includes various modifications, equivalents, or alternatives of the embodiments of the disclosure.

Figure 1A:
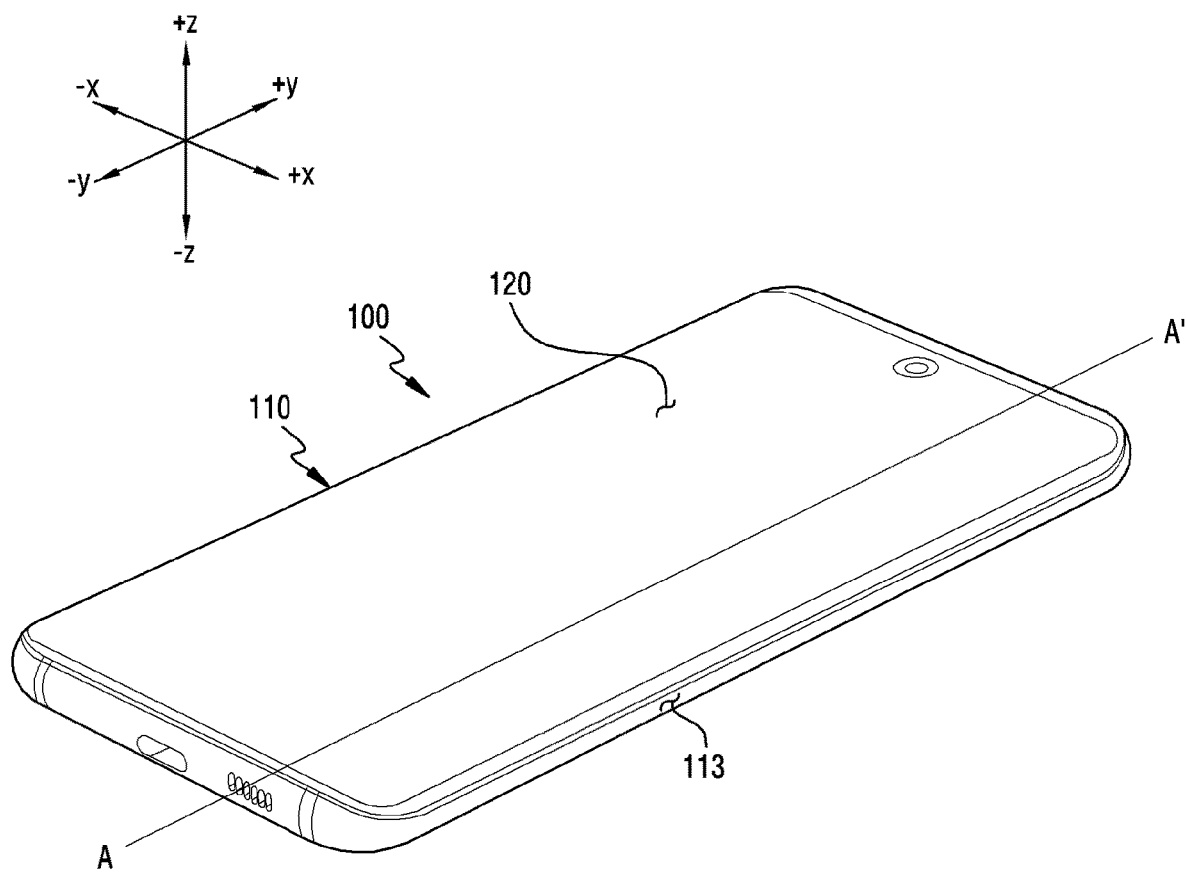
FIG. 1A is a perspective view illustrating a front surface of an electronic device according to various embodiments.
Figure 1B:
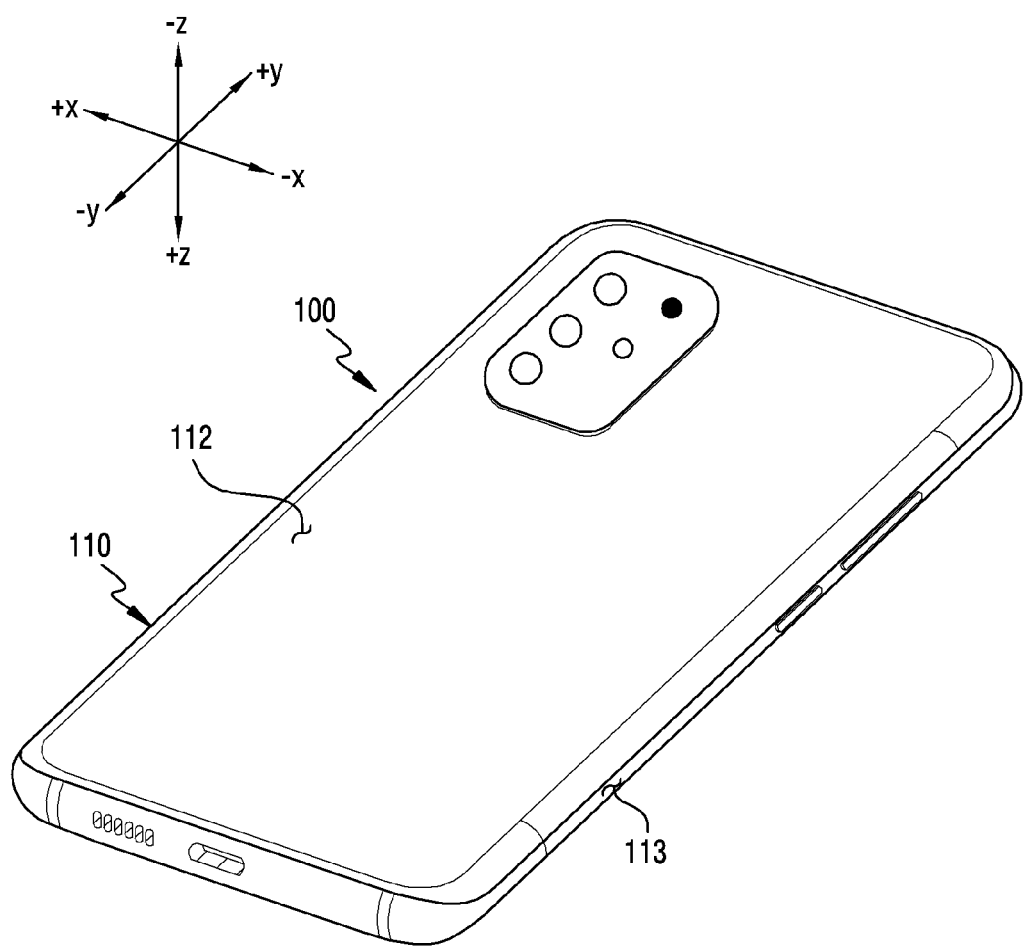
FIG. 1B is a perspective view illustrating a rear surface of the electronic device according to various embodiments.

FIG. 1A is a perspective view illustrating the front surface of an electronic device 100 (e.g., the surface of the electronic device 100 of FIG. 1A located in the +z-direction) according to various embodiments. FIG. 1B is a perspective view illustrating the rear surface of an electronic device 100 (e.g., the surface of the electronic device 100 of FIG. 1B located in the −z-direction) according to various embodiments.

Referring to FIGS. 1A and 1B, the electronic device 100 may include a housing 110, and the housing 110 may include a front surface plate 111, a rear surface plate 112, and a side surface member 113 surrounding the space between the front surface plate 111 and the rear surface plates 112.

In an embodiment, the display 120 may be disposed on the front surface plate 111 of the housing 110. In an example, the display 120 may occupy most of the front surface of the electronic device 100 (e.g., the surface located in the +z-direction of the electronic device 100 of FIG. 1A).

According to an embodiment, the rear surface plate 112 may be made of coated or colored glass, ceramic, polymer, metal (e.g., aluminum, stainless steel (STS), or magnesium), or a combination of two or more of these materials. According to an embodiment, the rear surface plate 112 may include a curved portion that is bent toward the side surface member 113 from at least one end and extends seamlessly.

According to an embodiment, the side surface member 113 may be coupled to the rear surface plate 112 and may include metal and/or polymer. According to an embodiment, the rear surface plate 112 and the side surface member 113 may be integrated with each other and may include the same material (e.g., a metal material such as aluminum).

According to an embodiment, a conductive portion of the side surface member 113 may be electrically connected to a wireless communication circuit to operate as an antenna radiator for transmitting and/or receiving a radio frequency (RF) signal of a predetermined frequency band. According to an embodiment, the wireless communication circuit may transmit an RF signal of the predetermined frequency band to the conductive portion of the side surface member 113 or receive an RF signal of the predetermined frequency band from the conductive portion.

The electronic device 100 illustrated in FIGS. 1A and 1B corresponds to an example and does not limit the shape of the device to which the technical idea disclosed herein is applied. The disclosure is applicable to various user devices including a portion capable of operating as an antenna radiator. For example, by adopting a flexible display and a hinge structure, the technical idea disclosed herein may also be applicable to a foldable electronic device that is foldable in a horizontal direction or a foldable in a vertical direction, a tablet computer, or a notebook computer.

Hereinafter, various example embodiments will be described with reference to the electronic device 100 illustrated in FIGS. 1A and 1B for convenience of description.

Figure 2:
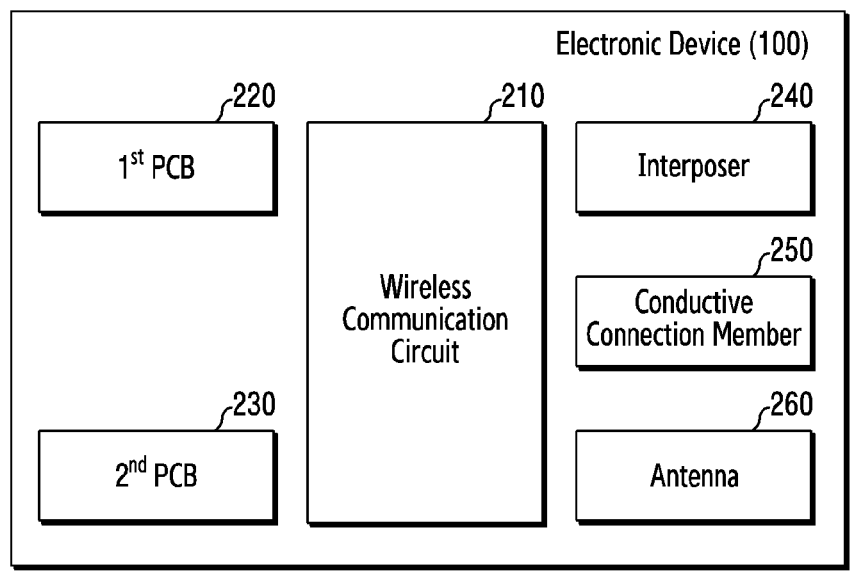
FIG. 2 is a block diagram illustrating an example hardware configuration of the electronic device according to various embodiments.

FIG. 2 is a block diagram illustrating an example hardware configuration of an electronic device 100 according to various embodiments.

Referring to FIG. 2, the electronic device 100 may include a wireless communication circuit 210, a first PCB 220, a second PCB 230, an interposer 240, at least one conductive connection member (e.g., including a conductive material) 250, and/or at least one antenna 260. In an embodiment, the electronic device 100 may further include other components in addition to the wireless communication circuit 210, the first PCB 220, the second PCB 230, the interposer 240, the least one conductive connection member 250, and/or the at least one antenna 260. For example, the electronic device 100 may further include a third PCB (not illustrated). In another example, the electronic device 100 may include at least two antennas.

According to an embodiment, the wireless communication circuit 210 may be electrically connected to the first PCB 220, the second PCB 230, the interposer 240, or the at least one antenna 260. For example, the wireless communication circuit 210 may transmit or receive a signal to or from an external device by being electrically connected to at least one antenna 260.

Figure 3A:
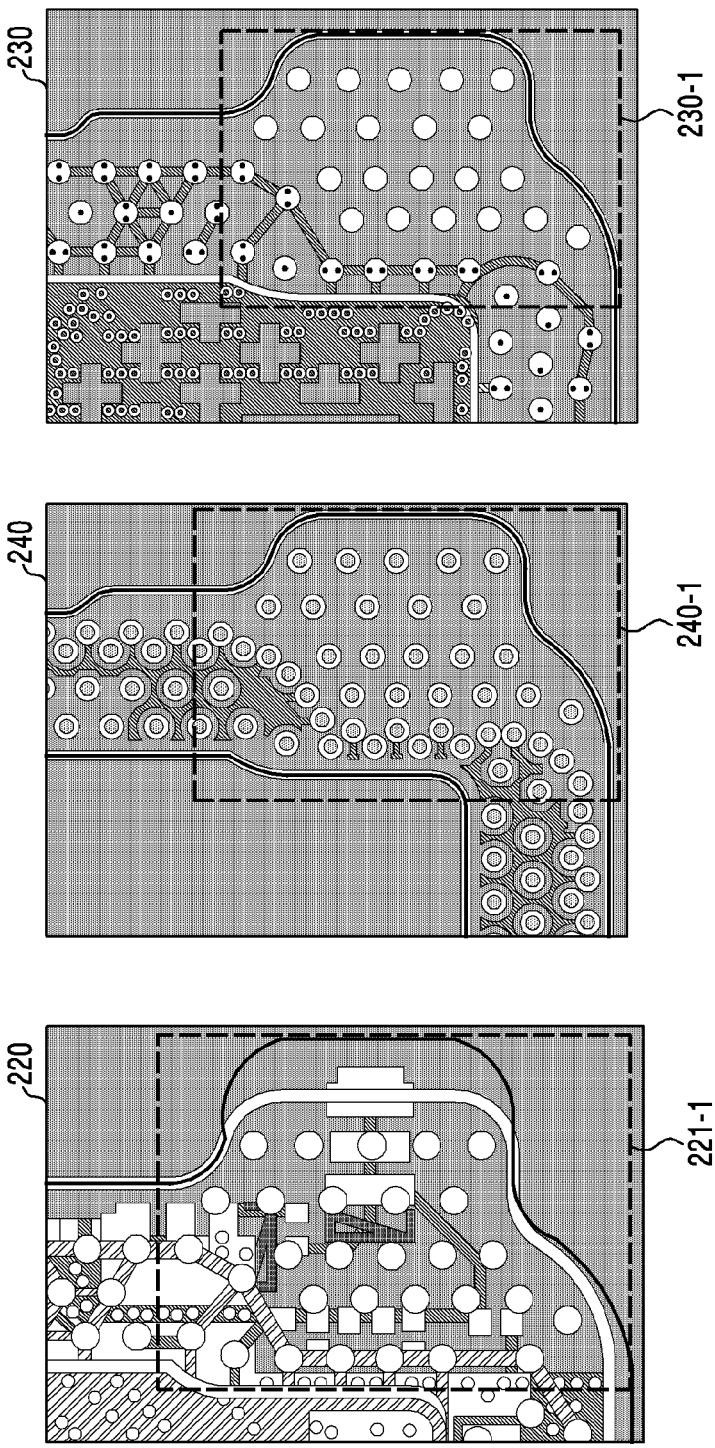
FIG. 3A is a diagram illustrating a first PCB, an interposer, and a second PCB of an electronic device according to various embodiments.

FIG. 3A is a diagram illustrating a first PCB 220, an interposer 240, and a second PCB 230 of an electronic device according to various embodiments. In an example, the first PCB 220 may correspond to a master PCB, and the second PCB 230 may correspond to a slave PCB.

Referring to FIG. 3A, the first PCB 220, the interposer 240, and/or the second PCB 230 included in the electronic device 100 may be stacked. In an example, the interposer 240 may be disposed between the first PCB 220 and the second PCB 230.

According to an embodiment, at least a portion of the first area 221-1 of the first PCB 220 may be made of a dielectric material. For example, a power feeding path may be provided in the first area 221-1 of the first PCB 220, and a material having a predetermined (e.g., specified) permittivity may be disposed around the power feeding path.

According to an embodiment, at least a portion of the second area 230-1 of the second PCB 230 may be made of a dielectric material. For example, a power feeding path may be provided in the second area 230-1 of the second PCB 230, and a material having a predetermined permittivity may be disposed around the power feeding path.

According to an embodiment, at least a portion of the third area 240-1 of the interposer 240 may be made of a dielectric material. For example, a conductive via (not illustrated) may be provided, and a material having a predetermined permittivity may be disposed around the conductive via (not illustrated).

Figure 3B:
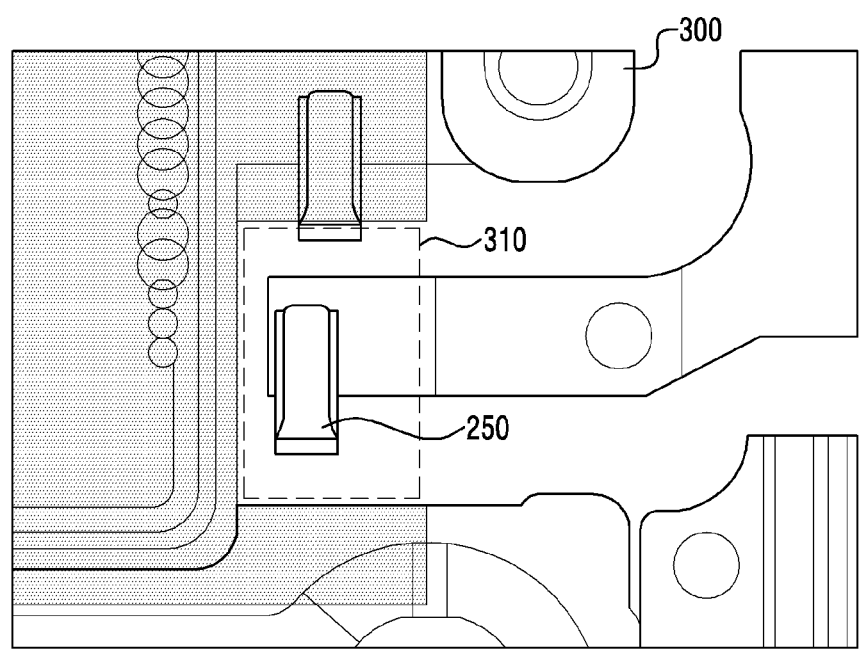
FIG. 3B is a diagram illustrating an area of an electronic device viewed from the second PCB of FIG. 3A according to various embodiments.

FIG. 3B is a diagram illustrating an area 300 of an electronic device 100 viewed from the second PCB 230 of FIG. 3A according to various embodiments.

According to an embodiment, a first space 310 at least partially defined by a non-conductive material may be provided in at least a portion of the electronic device 100. In an example, the conductive connection member 250 may be disposed in the first space 310 at least partially defined by a non-conductive material. The first space 310 and the conductive connection member 250 will be described in greater detail below with reference to FIG. 13.

Figure 4A:
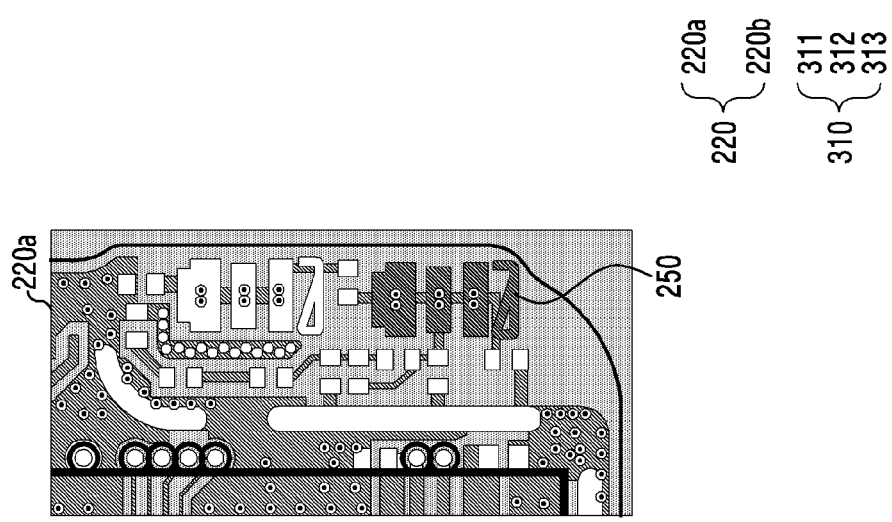
FIGS. 4A, 4B, 4C and 4D are diagrams illustrating a first PCB, an interposer, and a second PCB according to various embodiments.
Figure 4B:
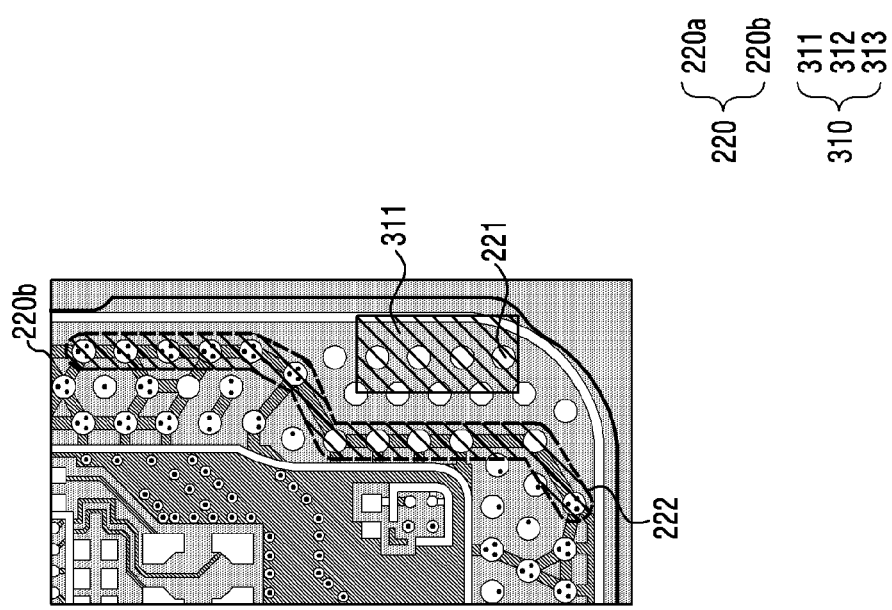
Figure 4C:
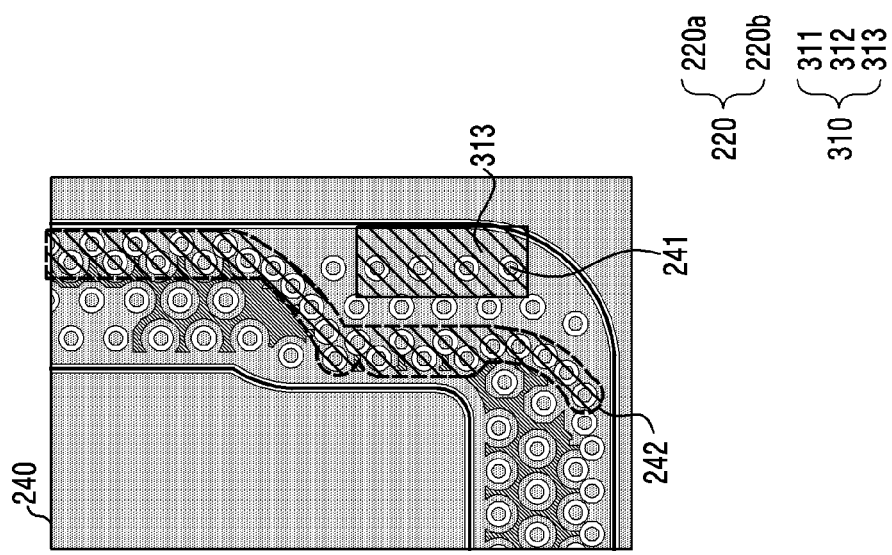
Figure 4D:
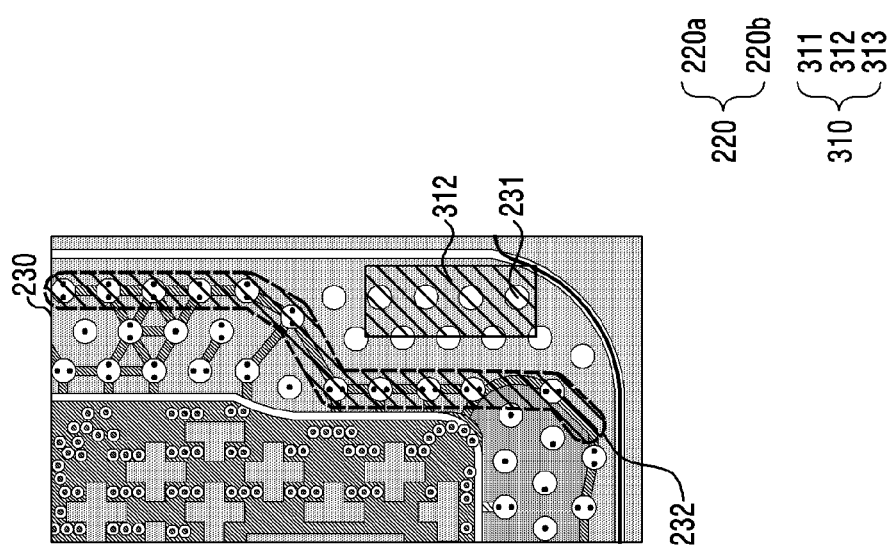

FIGS. 4A, 4B, 4C and 4D are diagrams illustrating a first PCB 220 (220a, 220b), an interposer 240, and a second PCB 230 according to an embodiment. It may be understood that FIG. 4A illustrates a first surface 220a of the first PCB 220 that is not in contact with the interposer 240, FIG. 4B illustrates a second surface of the first PCB 220 that is in contact with the interposer 240, FIG. 4C illustrates the interposer 240, and FIG. 4D illustrates the second PCB 230.

Referring to FIGS. 4A, 4B, 4C and 4D, one area of each of the first PCB 220, the interposer 240, and the second PCB 230 may include a shielding structure (or a ground portion) 222, 232, or 242 and a non-conductive area 311, 312, or 313. In an example, the first space 310 illustrated in FIG. 3B may include a first non-conductive area 311, a second non-conductive area 312, and a third non-conductive area (or a first portion of the interposer 230) 313.

According to an embodiment, the first PCB 220 may include a first shielding structure (or a first ground portion) 222 and a first non-conductive area 311. In an example, the first shielding structure 222 may provide shielding for at least one electronic component disposed on the first PCB 220. In another example, the first non-conductive area 311 may be made of a dielectric material having a predetermined permittivity.

According to an embodiment, the interposer 240 may include a second shielding structure (or a second ground portion) 242 and a second non-conductive area 313. In an example, the second shielding structure 242 may provide shielding for at least one electronic component disposed in the electronic device 100. In another example, the second non-conductive area 313 may be made of a dielectric material having a predetermined permittivity.

According to an embodiment, the second PCB 230 may include a third shielding structure (or a first ground portion) 232 and a third non-conductive area 312. In an example, the third shielding structure 232 may provide shielding for at least one electronic component disposed on the second PCB 230. In another example, the third non-conductive area 312 may be made of a dielectric material having a predetermined permittivity.

Figure 5A:
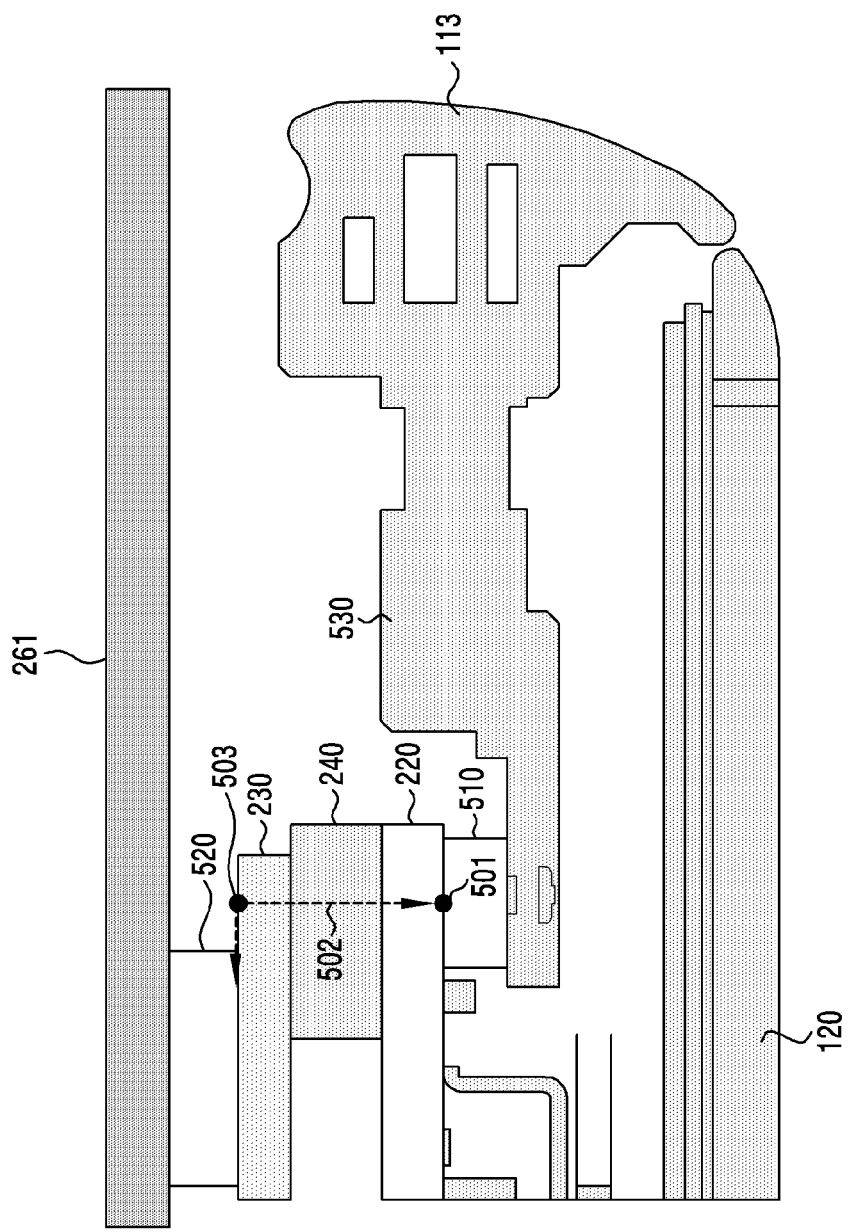
FIG. 5A is a cross-sectional view of an electronic device according to various embodiments.

FIG. 5A is a cross-sectional view of an electronic device 100 according to various embodiments.

Referring to FIG. 5A, the electronic device 100 may include a first conductive connection member (e.g., including a conductive material) 510, a first PCB 220, an interposer 240, a second PCB 230, a second conductive connection member (e.g., including a conductive material) 520, and/or a first antenna 261. In an example, the at least one antenna 260 may include a first antenna 261.

According to an embodiment, the electronic device 100 may feed power to the first PCB 220 via the first conductive connection member 510. In an example, the first conductive connection member 510 may be a C-clip.

According to an embodiment, the electronic device 100 may include a frame (or, supporting member, bracket) 530, and the frame 530 may form at least part of the side surface of the electronic device 100. For example, the frame 530 may include the side surface member 113 and the side surface member 113 may form at least part of the side surface of the electronic device 100.

According to an embodiment, radiation current fed via the first conductive connection member 510 may be fed to the second PCB 230 via the conductive via included in the interposer 240 and via the first PCB 220.

According to an embodiment, the radiation current fed to the second PCB 230 may be fed to the first antenna 261 via the second conductive connection member 520. In an example, the second conductive connection member 520 may be a C-clip.

According to an embodiment, since the conductive via is provided in the interposer 240, the radiation current fed from the first conductive connection member 510 may be fed to the first antenna 261 without a separate power feeding path.

Figure 5B:
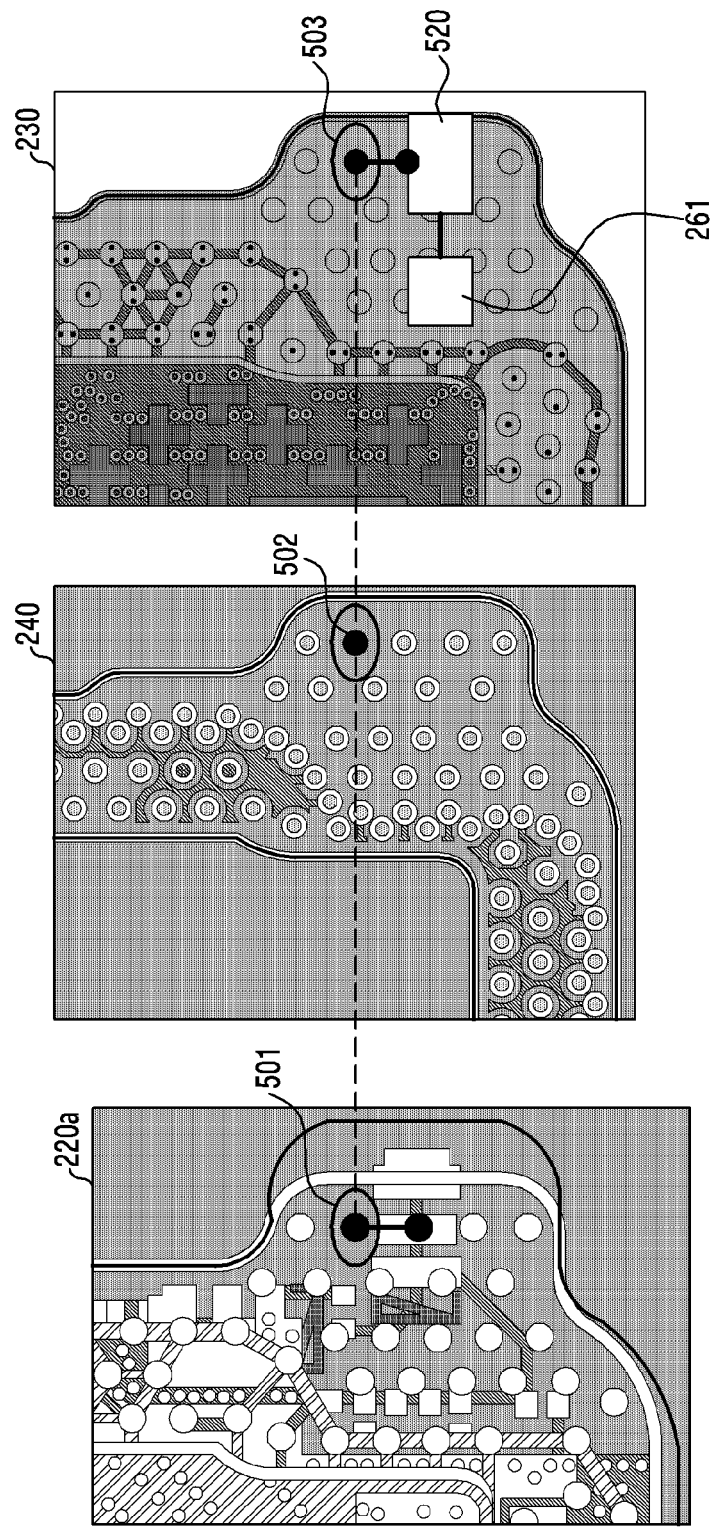
FIG. 5B is a diagram illustrating a first PCB, an interposer, and a second PCB of FIG. 5A according to various embodiments.

FIG. 5B is a diagram illustrating the first PCB 220, the interposer 240, and the second PCB 230 of FIG. 5A according to various embodiments.

Referring to FIG. 5B, the interposer 240 included in the electronic device 100 may include a conductive via 502.

According to an embodiment, the conductive via 502 may be provided in at least one area of the interposer 240. In an example, the conductive via 502 may correspond to an area in which a partial area of the interposer 240 is filled with a conductive material.

According to an embodiment, the conductive via 502 provided in the interposer 240 may be electrically connected to the first portion 501 of the first surface 220*a* of the first PCB 220 and the second portion 503 of the second PCB 230. In an example, the radiation current fed from the first surface 220*a* of the first PCB 220 may be fed to the second portion 503 of the second PCB 230 via the conductive via 502.

According to an embodiment, the second portion 503 of the second PCB 230 may be electrically connected to the first antenna 261 via the second conductive connection member 520. In an example, when power is fed via the first portion 501 of the first surface 220*a* of the first PCB 220, the power may be fed to the first antenna 261 via the conductive via 502, the second portion 503 of the second PCB 230, and the second conductive connection member 520.

Figure 6A:
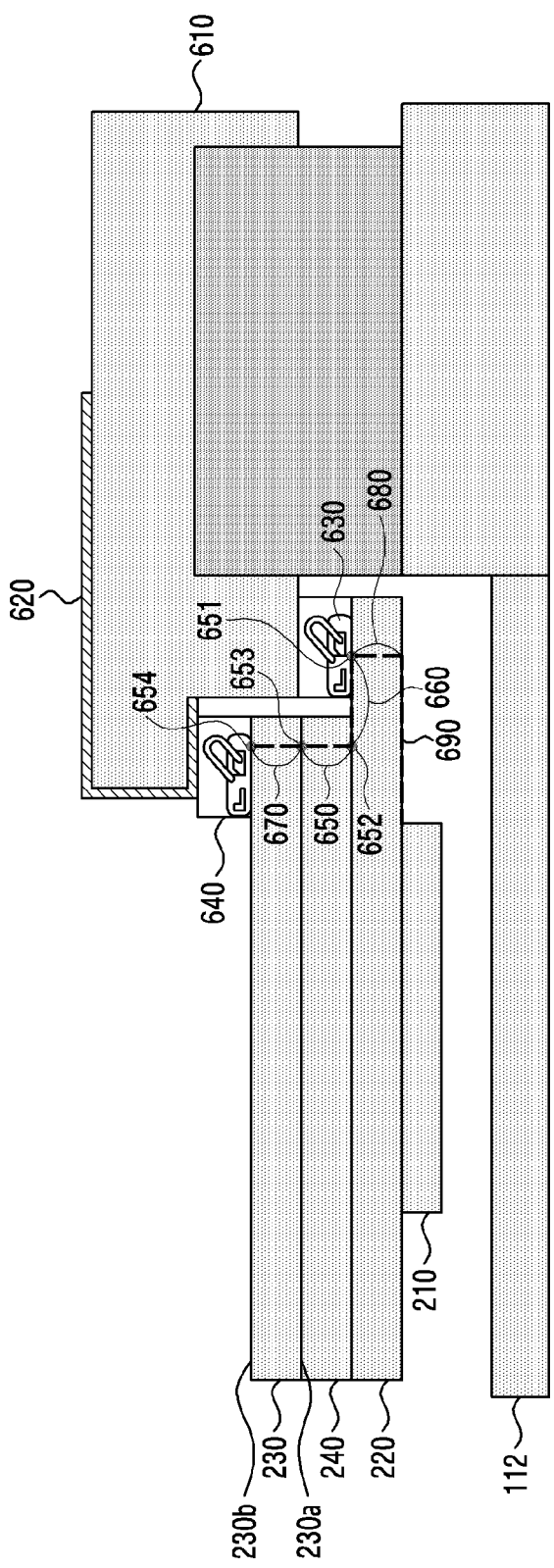
FIG. 6A is a diagram illustrating at least a portion of a cross section taken along the line A-A' in the electronic device of FIG. 1A according to various embodiments.
Figure 6B:
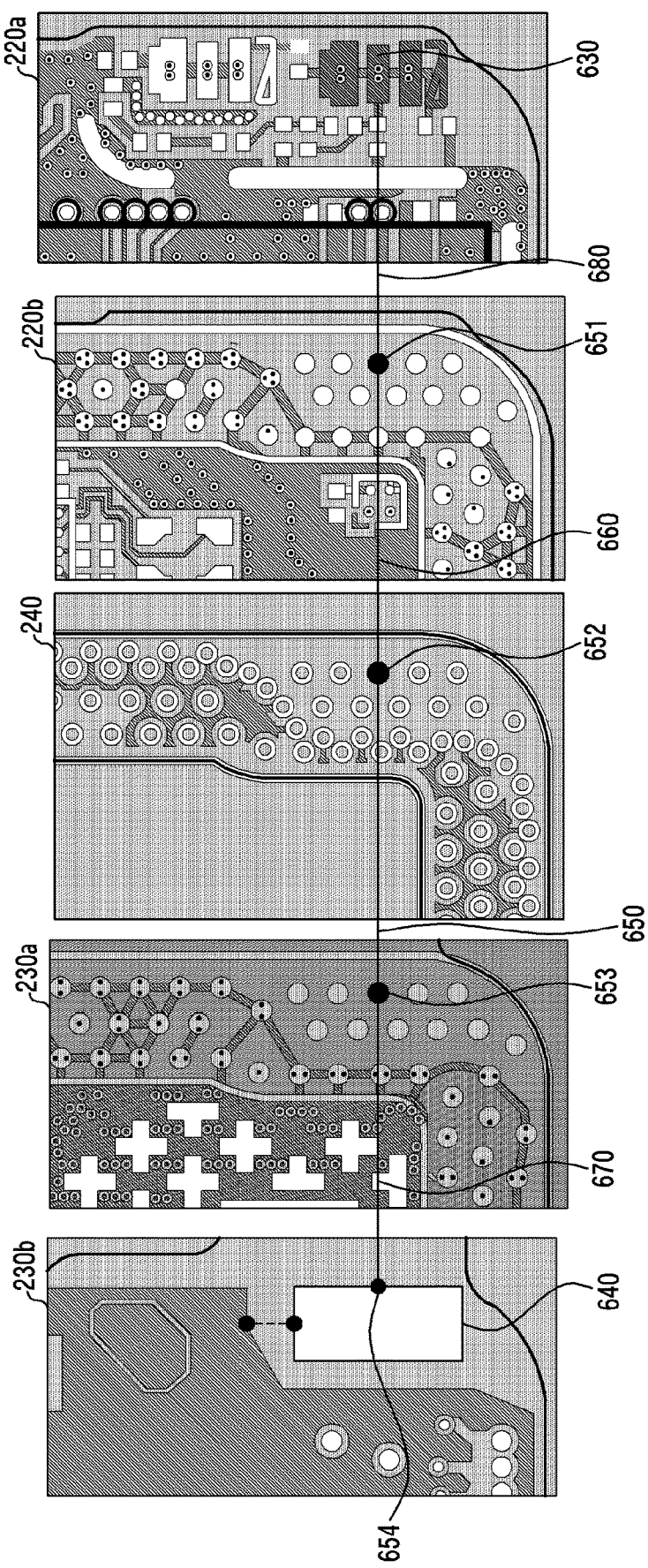
FIG. 6B is a diagram illustrating a first PCB, an interposer, and a second PCB of FIG. 6A according to various embodiments.

FIG. 6A is a diagram illustrating at least a portion of a cross section taken along line A-A' in the electronic device 100 of FIG. 1A according to various embodiments. FIG. 6B illustrates a first PCB 220, an interposer 240, a second PCB 230, and a rear surface plate 112 of FIG. 6A according to various embodiments.

Referring to FIGS. 6A and 6B, a radiation current fed by the wireless communication circuit 210 may be fed to an antenna pattern 620 provided on an antenna carrier 610 via a conductive via 650.

According to an embodiment, a wireless communication circuit 210 may be electrically connected to a first conductive connection member 630 via a first conductive path 690 provided along one surface of the first PCB 220, a second conductive path 680 provided inside the first PCB 220, and a first point 651. In an example, a third conductive path 660 provided between the first PCB 220 and the interposer 240 and the conductive via 650 provided in the interposer 240 may be electrically connected to each other at a second point 652, and the conductive via 650 and a fourth conductive path 670 provided inside the second PCB 230 may be electrically connected to each other at a third point 653. In another example, the wireless communication circuit 210 may be electrically connected to the second conductive connection member 640 at a fourth point 654 via the first conduction path 690, the second conduction path 680, the third conduction path 660, the conductive via 650, and the fourth conduction path 670.

According to an embodiment, the wireless communication circuit 210 may feed power to the antenna pattern 620 provided on the antenna carrier 610, via the first conductive connection member 630, the conductive via 650, and the second conductive connection member (or a second power feeding connection portion) (e.g., the second conductive connection member 520 in FIG. 5A). In an example, the conductive via 650 provided in the interposer 240 may be electrically connected to a first surface 230*a* of the second PCB 230 via a conductive material (e.g., a solder ball) 651, so that the wireless communication circuit 210 is capable of feeding power to the antenna pattern 620 via the second conductive connection member 640 disposed on a second surface 230*b* of the second PCB 230 opposite to the first surface 230*a* without a separate power feeding path. Due to this, the electronic device 100 may be capable of feeding power to a plurality of antennas without securing a separate space for a power feeding path.

Figure 7A:
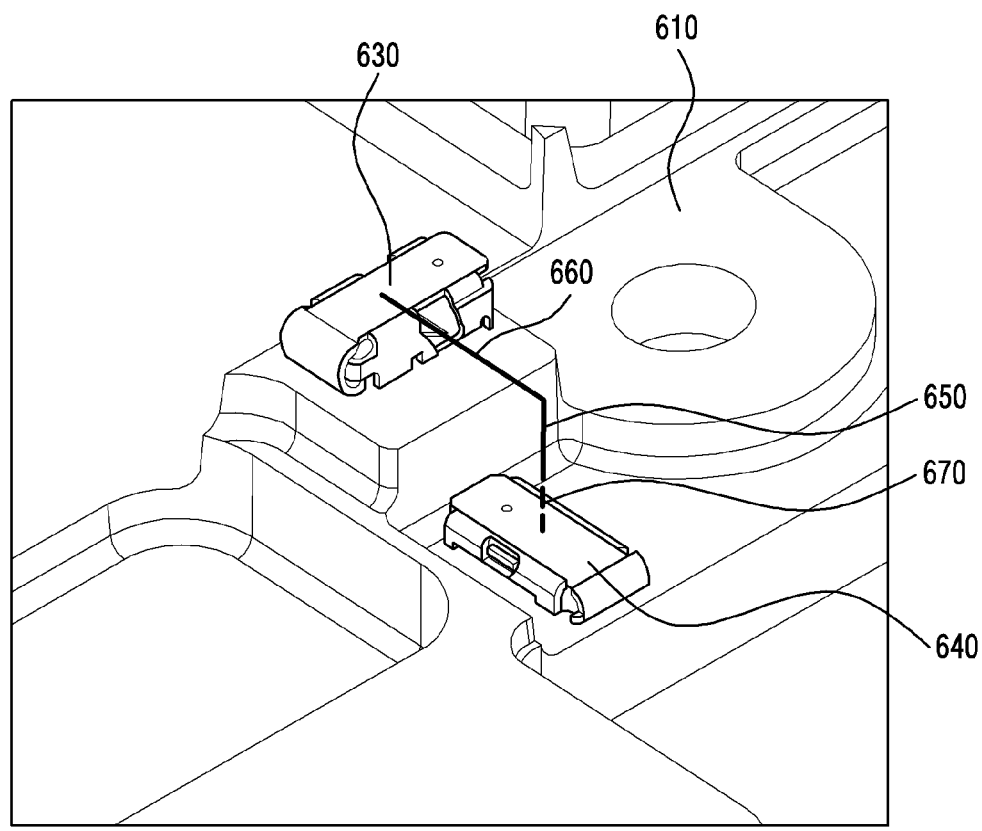
FIG. 7A is a perspective view illustrating a first conductive connection member and a second conductive connection member according to various embodiments.

FIG. 7A is a perspective view illustrating a first conductive connection member 630 and a second conductive connection member 640 according to various embodiments.

Referring to FIG. 7A, the first conductive connection member 630 and the second conductive connection member 640 may be connected to an antenna carrier 610.

According to an embodiment, radiation current fed to the first conductive connection member 630 may be fed to the second conductive connection member 640 via a conductive via 650.

Figure 7B:
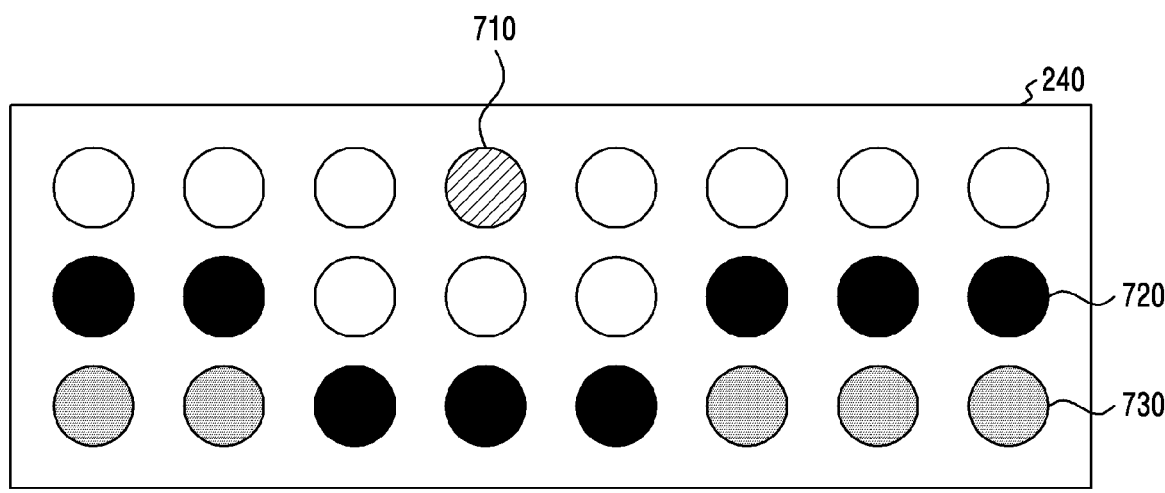
FIG. 7B is a diagram illustrating an interposer including vias according to various embodiments.
Figure 7C:
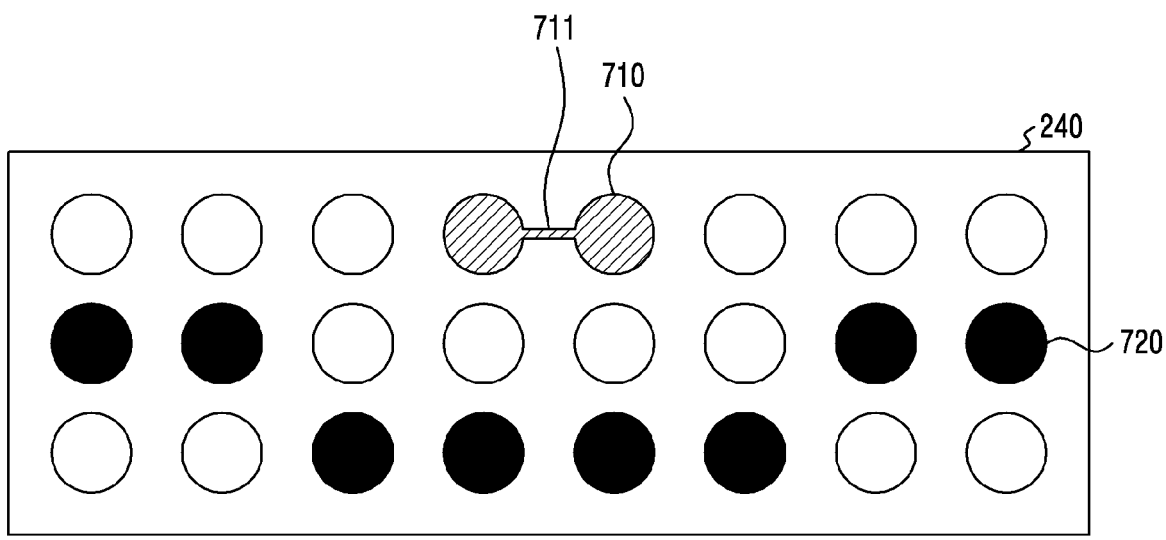
FIG. 7C is a diagram illustrating an interposer including vias according to various embodiments.
Figure 7D:
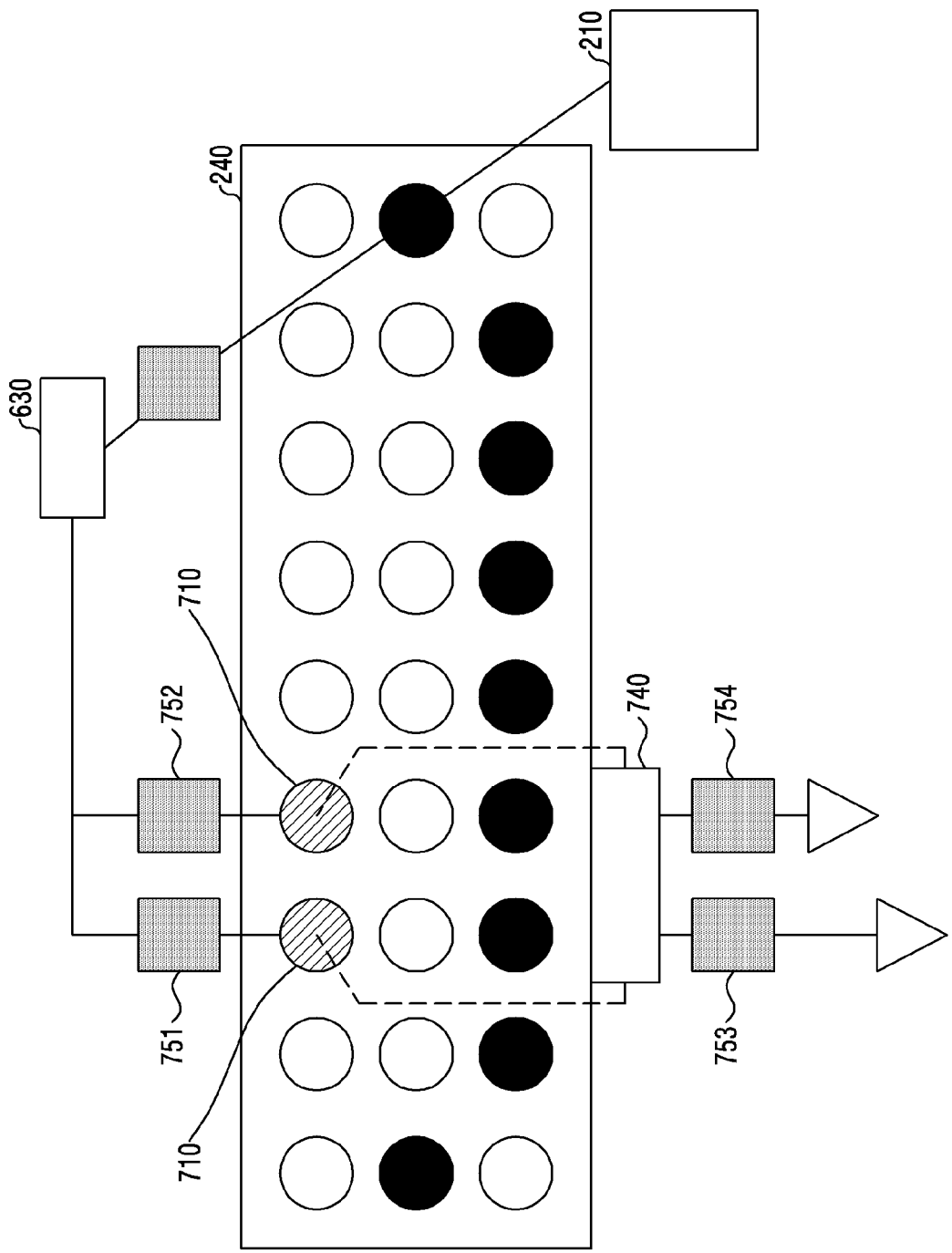
FIG. 7D is a diagram illustrating an interposer including vias according to various embodiments.

FIG. 7B is a diagram illustrating an interposer 240 including a conductive via 710 according to various embodiments. FIG. 7C is a diagram illustrating an interposer 240 including a conductive via 710 according to various embodiments. FIG. 7D is a diagram illustrating an interposer 240 including a conductive via 710 according to various embodiments.

Referring to FIGS. 7B, 7C, and 7D, the interposer 240 may include a conductive via 710, a ground portion 720, and a signal line 730 between a first PCB 220 and a second PCB 230.

According to an embodiment, the interposer 240 may include at least one conductive via 710. For example, the interposer 240 may include one conductive via 710 and may feed power to an antenna via the one conductive via 710.

According to an embodiment, the interposer 240 may include a plurality of conductive vias 710 and a via connection portion 711. For example, the interposer 240 may include two conductive vias 710 and a via connection portion 711 electrically connecting the two conductive vias 710 to each other. In an example, when the interposer 240 includes a plurality of conductive vias 710 and a via connection portion 711, the electronic device 100 may perform impedance tuning through the plurality of conductive vias 710. For example, in a case where the interposer 240 includes two conductive vias 710, the electronic device 100 may adjust impedance by increasing an electrical length compared to the case where the interposer includes one conductive via 710. As another example, in a case where the interposer 240 includes four conductive vias 710, the electronic device 100 may adjust impedance by doubling an electrical length compared to the case where the interposer includes two conductive vias 710.

According to an embodiment, when the interposer 240 includes a plurality of conductive vias 710, a ground area may be expanded. In an example, when the electronic device 100 includes an interposer 240 including a plurality of conductive vias 710, it is possible to prevent and/or reduce antenna performance from being deteriorated due to parasitic resonance by having a wider ground area.

According to an embodiment, the conductive vias 710 included in the interposer 240 may be fed with power from a wireless communication circuit 210 electrically connected to the first conductive connection member 630 via a first power feeding path 751 or a second power feeding path 752. In an example, the electronic device 100 may adjust an electrical length by changing the power feeding path connecting the conductive via 710 and the first conductive connection member 630. For example, when the conductive via 710 and the first conductive connection member 630 are connected to each other via the second power feeding path 752 in a state in which the conductive via 710 and the first conductive connection member 630 are connected to each other via the first power feeding path 751, the electronic device 100 may change the electrical length between the conductive via 710 and the first conductive connection member 630. Through this, impedance tuning may be possible.

According to an embodiment, the conductive vias 710 may be connected to the second PCB 230 via a ground connection portion 740 and via either the first ground path 753 or the second ground path 754.

Figure 8A:
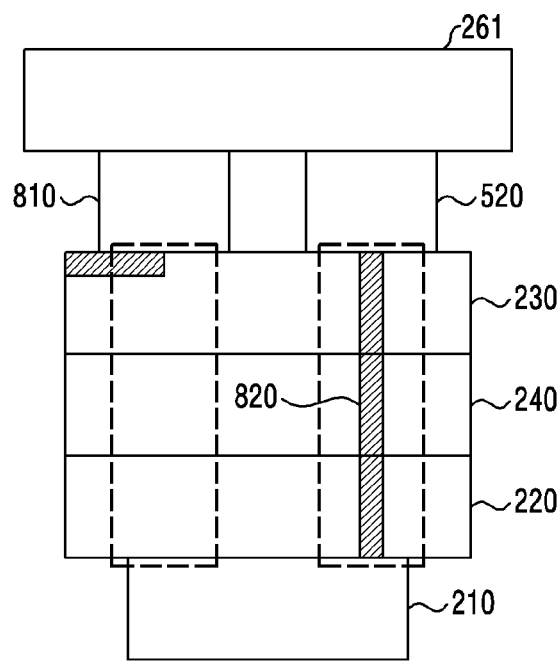
FIG. 8A is a diagram illustrating a first PCB, an interposer, and a second PCB according to various embodiments.
Figure 8B:
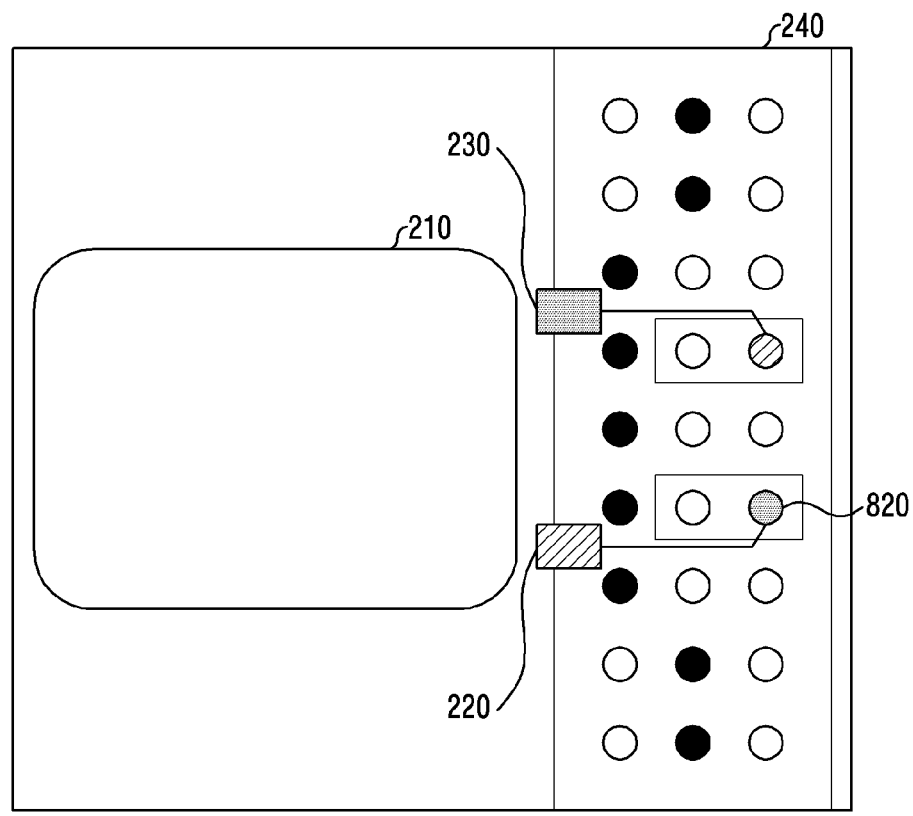
FIG. 8B is a diagram illustrating the first PCB, the interposer, and the second PCB of FIG. 8A according to various embodiments.

FIG. 8A is a diagram illustrating a first PCB 220, an interposer 240, and a second PCB 230 according to various embodiments. FIG. 8B is a diagram illustrating the first PCB 220, the interposer 240, and the second PCB 230 of FIG. 8A according to various embodiments.

Referring to FIGS. 8A and 8B, a wireless communication circuit 210 may feed power to a first antenna 261 via the first PCB 220, the interposer 240, the power feeding path 820 penetrating the second PCB 230, and a second conductive connection member 520.

According to an embodiment, the second PCB 230 may be electrically connected to the first antenna 261 via a ground connection portion 810. In an example, the first antenna 261 may be connected to a ground area provided on the second PCB 230 via the ground connection portion 810.

Figure 9A:
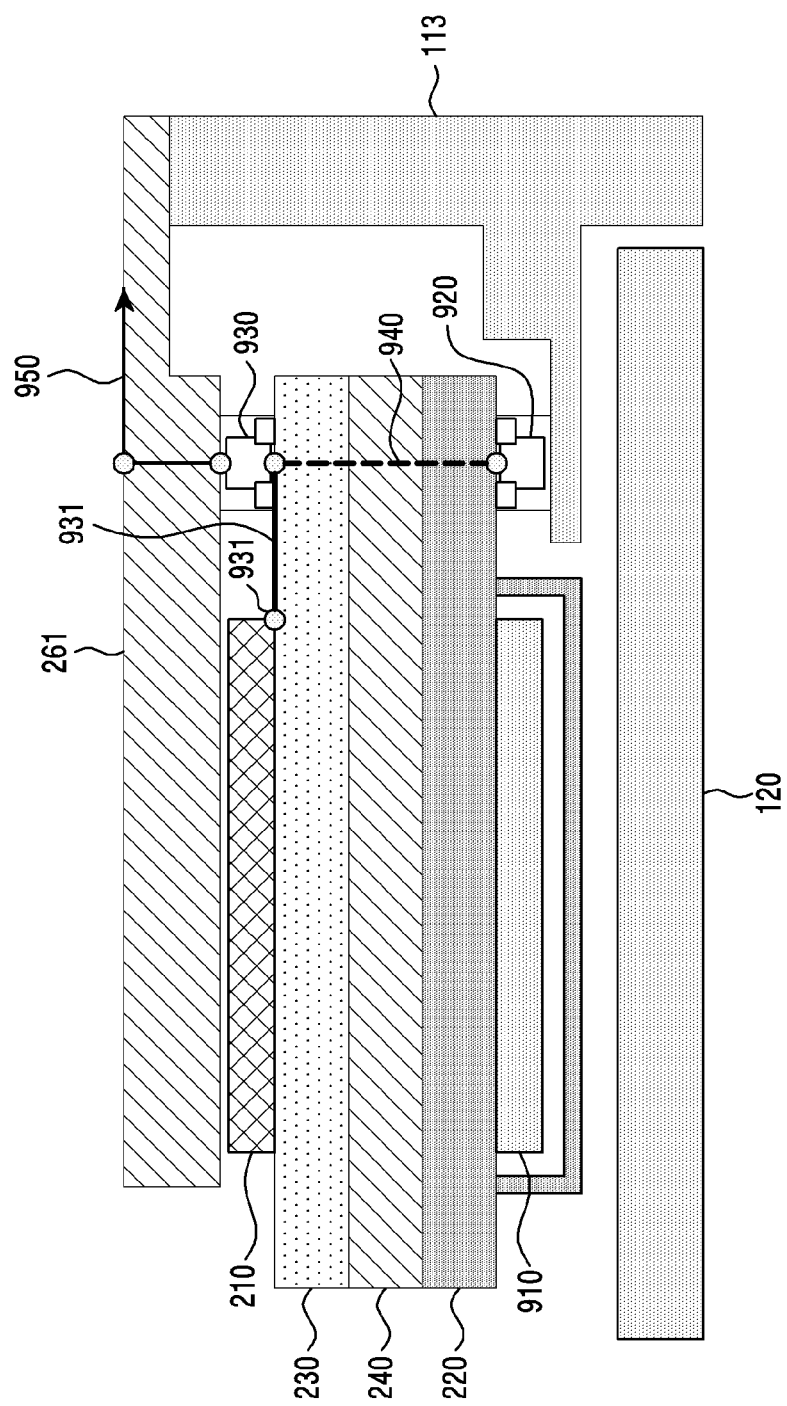
FIG. 9A is a diagram illustrating at least a portion of a cross section taken along the line A-A' in the electronic device of FIG. 1A according to various embodiments.

FIG. 9A is a diagram illustrating at least a portion of a cross section taken along the line A-A' in the electronic device 100 of FIG. 1A according to various embodiments.

Referring to FIG. 9A, the wireless communication circuit 210 may be disposed on the second PCB 230, and an electrical component 910 may be disposed on the first PCB 220. In an example, the display 120 may be disposed adjacent to the electrical component 910.

According to an embodiment, the wireless communication circuit 210 may feed power to a first conductive connection member 920 via a first power feeding path 931 and a conductive via 940. In an example, when the wireless communication circuit 210 feeds power to the first conductive connection member 920, the side surface member 113 connected to the first conductive connection member 920 may operate as an antenna radiator.

According to an embodiment, the wireless communication circuit 210 may feed power to a second conductive connection member 930 via the first power feeding path 931. In an example, when the wireless communication circuit 210 feeds power to the second conductive connection member 930, a first radiation current 950 may be formed in the first antenna 261.

Figure 9B:
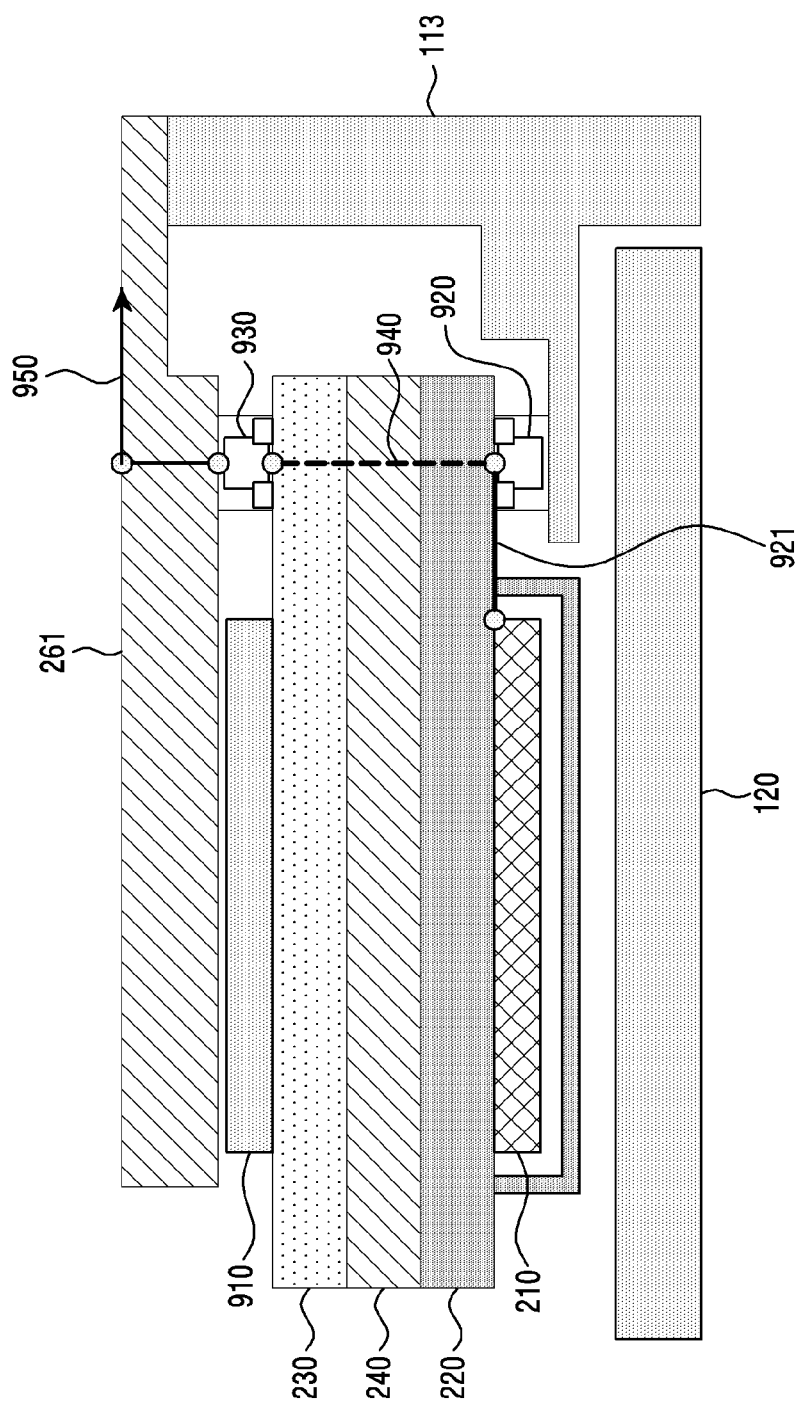
FIG. 9B is a diagram illustrating at least a portion of a cross section taken along the line A-A' in the electronic device of FIG. 1A according to various embodiments.

FIG. 9B illustrates at least a portion of a cross section taken along the line A-A' in the electronic device 100 of FIG. 1A according to various embodiments.

Referring to FIG. 9B, the wireless communication circuit 210 may be disposed on the first PCB 220, and the electrical component 910 may be disposed on the second PCB 230. In an example, the display 120 may be disposed adjacent to the wireless communication circuit 210.

According to an embodiment, the wireless communication circuit 210 may feed power to the first conductive connection member 920 via the second power feeding path 921. In an example, when the wireless communication circuit 210 feeds power to the first conductive connection member 920, the side surface member 113 connected to the first conductive connection member 920 may operate as an antenna radiator.

According to an embodiment, the wireless communication circuit 210 may feed power to the second conductive connection member 930 via the second power feeding path 921 and the conductive via 940. In an example, when the wireless communication circuit 210 feeds power to the second conductive connection member 930, a first radiation current 950 may be formed in the first antenna 261.

Figure 10:
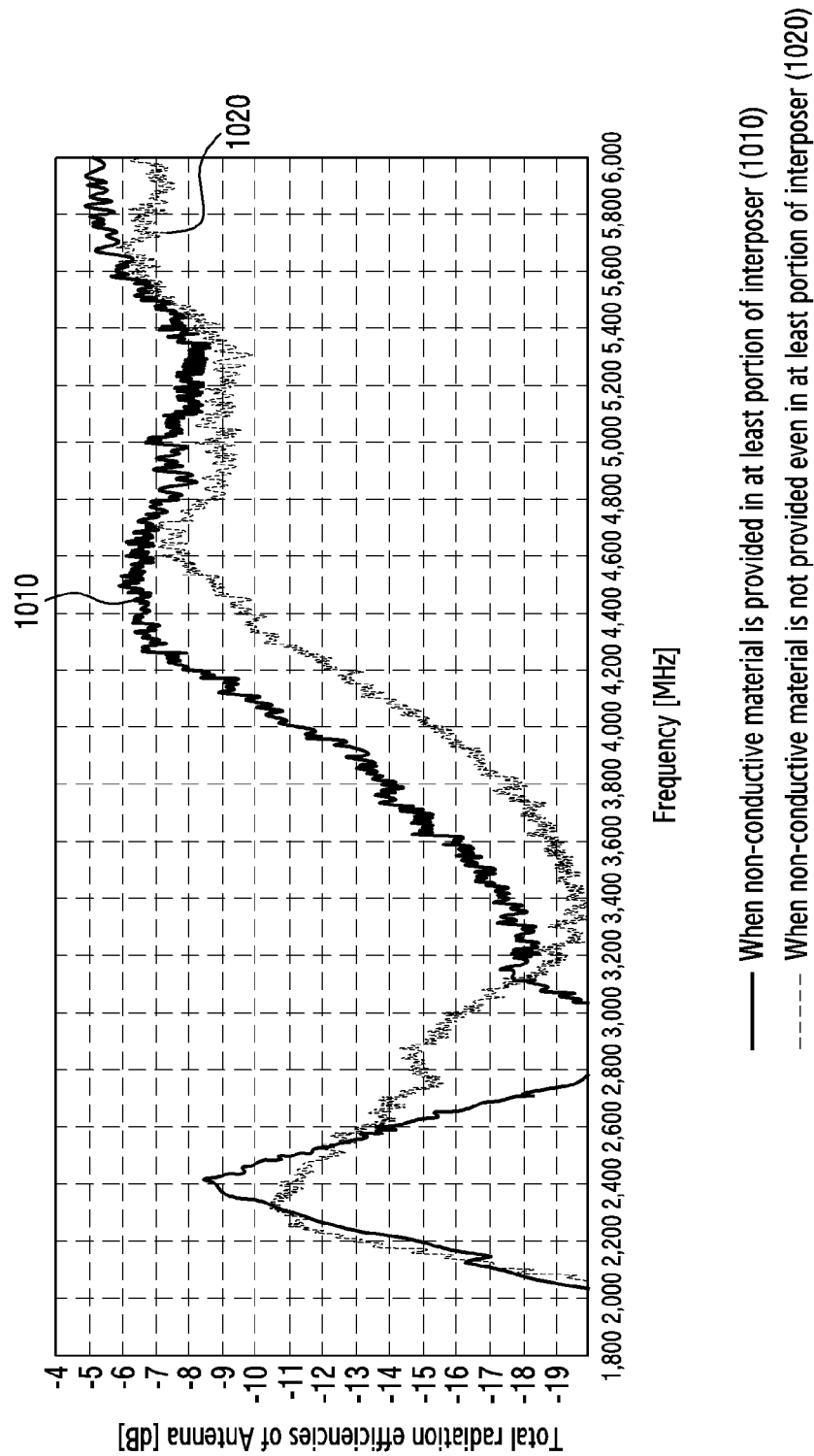
FIG. 10 is a graph illustrating total radiation efficiencies of an electronic device according to various embodiments.

FIG. 10 is a graph illustrating total radiation efficiencies of the electronic device 100 according to various embodiments.

Referring to FIG. 10, in the case where a non-conductive material is provided in at least a portion of the interposer 240, the total antenna radiation efficiency may be improved compared to the case where a non-conductive material is not provided even in at least a portion of the interposer 240.

According to an embodiment, comparing the graph 1010 in the case where the non-conductive material is provided in at least a portion of the interposer 240 with the graph 1020 in the case where a non-conductive material is not provided even in at least a portion of the interposer 240, a higher antenna total radiation efficiency may be obtained in the frequency band between about 2 GHz and about 6 GHz.

Figure 11A:
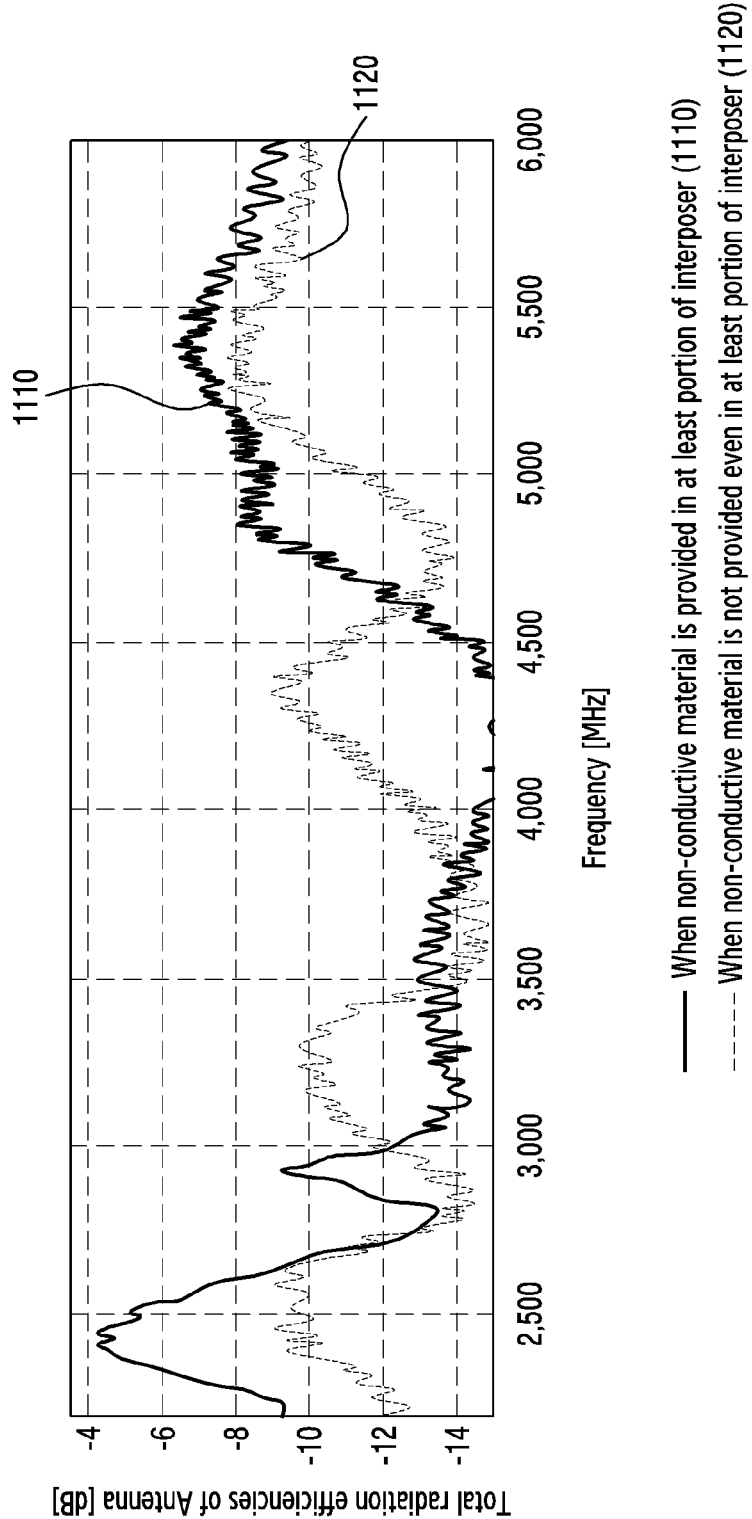
FIG. 11A is a graph illustrating total radiation efficiencies of an electronic device according to various embodiments.
Figure 11B:
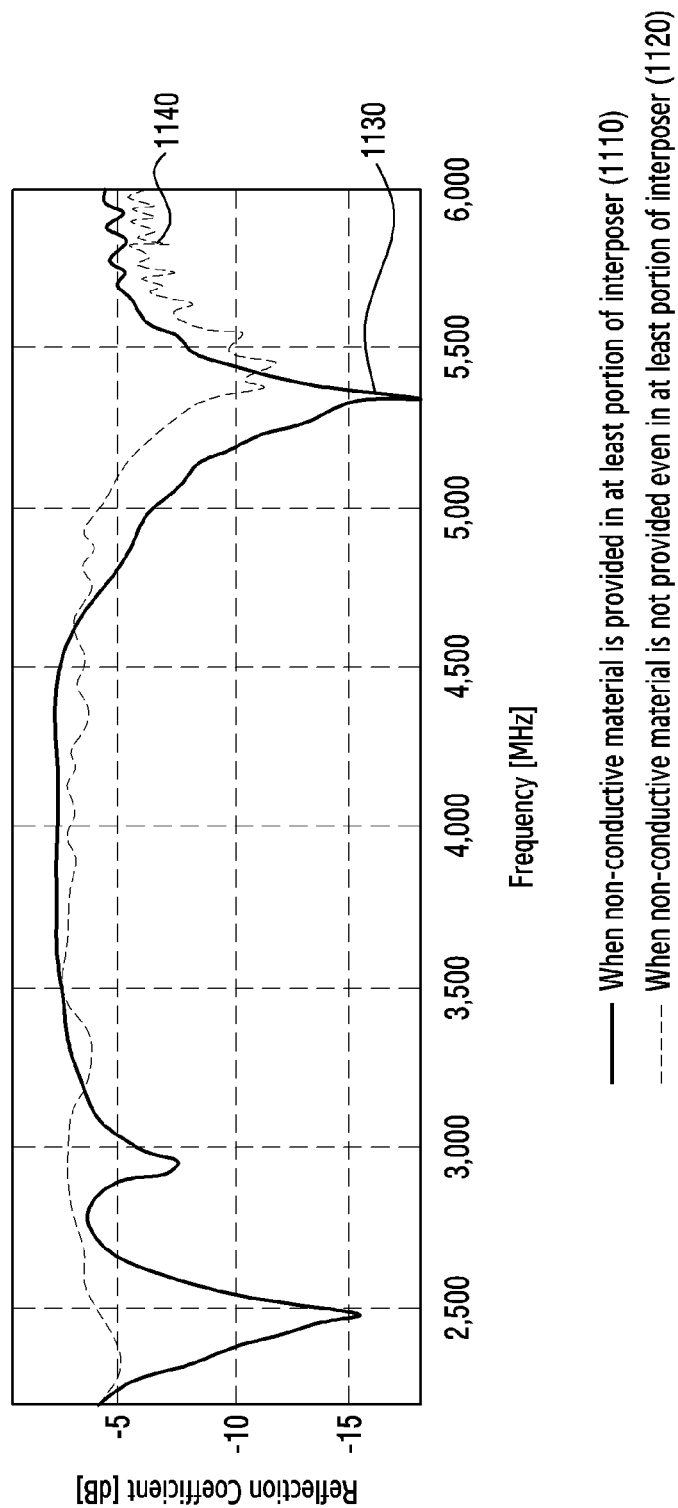
FIG. 11B is a graph illustrating reflection coefficients of an electronic device according to various embodiments.

FIG. 11A is a graph illustrating total radiation efficiencies of the electronic device 100 according to various embodiments. FIG. 11B is a graph illustrating reflection coefficients of the electronic device 100 according to various embodiments.

Referring to FIGS. 11A and 11B, in the case where a non-conductive material is provided in least a portion of the interposer 240, the total radiation efficiency of the antenna may be improved in the frequency bands of about 2.4 GHz and about 5 GHz compared to the case where a non-conductive material is not provided even in at least a portion of the interposer 240.

According to an embodiment, in the frequency bands of about 2.4 GHz and about 5 GHz, the total radiation efficiency graph 1110 of the antenna in the case where a non-conductive material is provided in at least a portion of the interposer 240 may have a higher value compared to the total radiation efficiency graph 1120 of the antenna in the case where a non-conductive material is not provided even in at least a portion of the interposer 240. In another example, in the frequency bands of about 2.4 GHz and about 5 GHz, the reflection coefficient graph 1130 in the case where a non-conductive material is provided in at least a portion of the interposer 240 may have a lower value than the reflection coefficient graph 1140 in the case where a non-conductive material is not provided even in at least a portion of the interposer 240.

Figure 12:
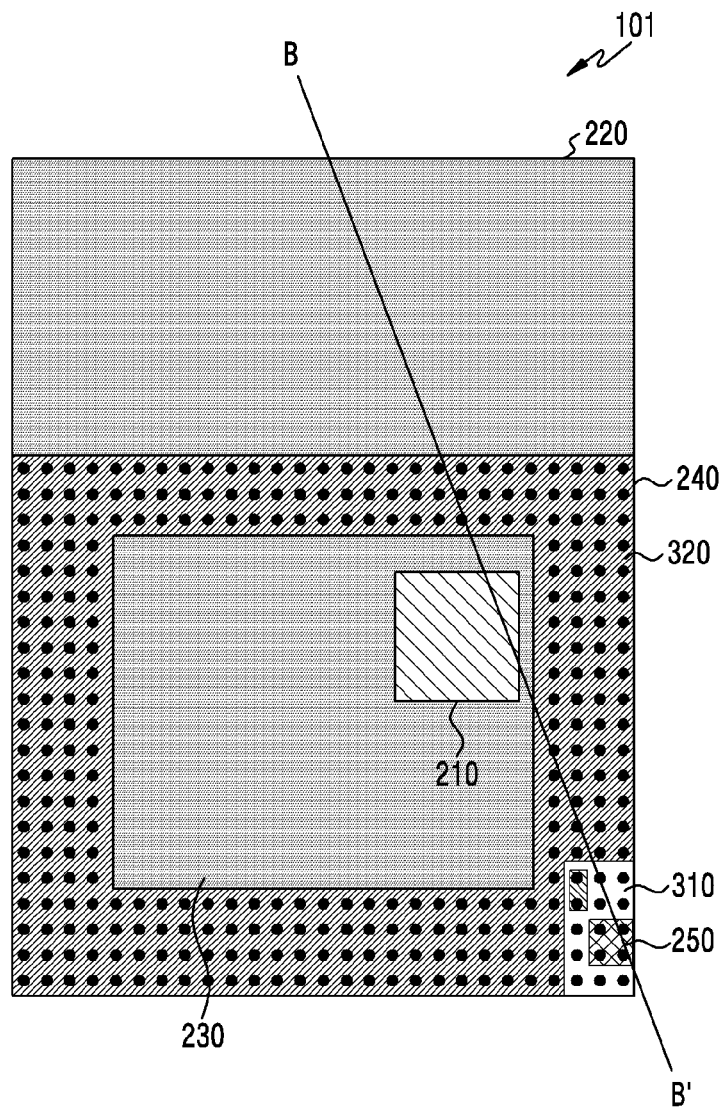
FIG. 12 is a diagram illustrating one surface of a printed board assembly (PBA) included in an electronic device according to various embodiments.

FIG. 12 is a diagram illustrating one surface of a printed board assembly (PBA) 101 included in the electronic device 100 according to various embodiments (e.g., the surface of the first PCB 220 that is viewed from the second surface 230b of the second PCB 230 in FIG. 6A or 6B).

Referring to FIG. 12, the PBA 101 may include a first PCB 220, a second PCB 230, an interposer 240, and at least one conductive connection member 250. In an example, the PBA 101 may further include other components in addition to the first PCB 220, the second PCB 230, the interposer 240, and/or the at least one conductive connection member 250. For example, the PBA 101 may further include a wireless communication circuit 210 or at least one antenna 260.

According to an embodiment, the second PCB 230 may be disposed on at least a portion of the area provided by the first PCB 220. In an example, the second PCB 230 may be disposed in a partial area of the area provided by the first PCB 220.

According to an embodiment, the interposer 240 may be disposed between the first PCB 220 and the second PCB 230 in at least a partial area of the area provided by the first PCB 220. In an example, the interposer 240 may be provided only in a partial area of the area provided by the first PCB 220.

According to an embodiment, in at least a portion of an area where the first PCB 220, the second PCB 230, and the interposer 240 overlap, a first space 310 and a second space 320 different from the first space 310 may be provided. In an example, a conductive connection member 250 may be provided in the first space 310.

Hereinbelow, it may be understood that FIGS. 13 to 21 illustrate a PBA 101 according to various example embodiments and that the hardware configuration included in the PBA 101 is the same as or similar to the hardware configuration included in the PBA 101 illustrated in FIG. 12.

Figure 13:
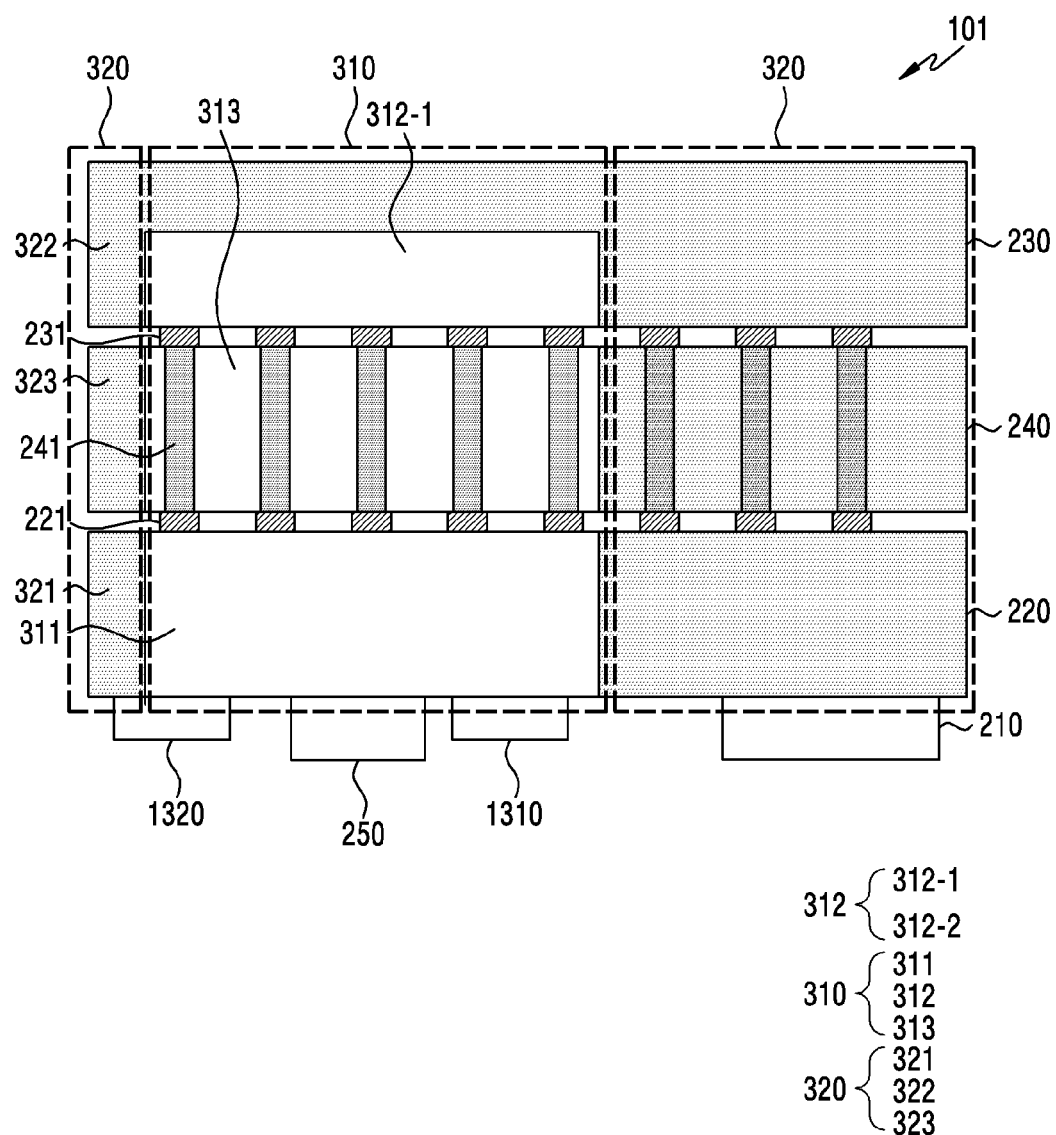
FIG. 13 is a cross-sectional view of a PBA included in an electronic device according to various embodiments.
Figure 14:
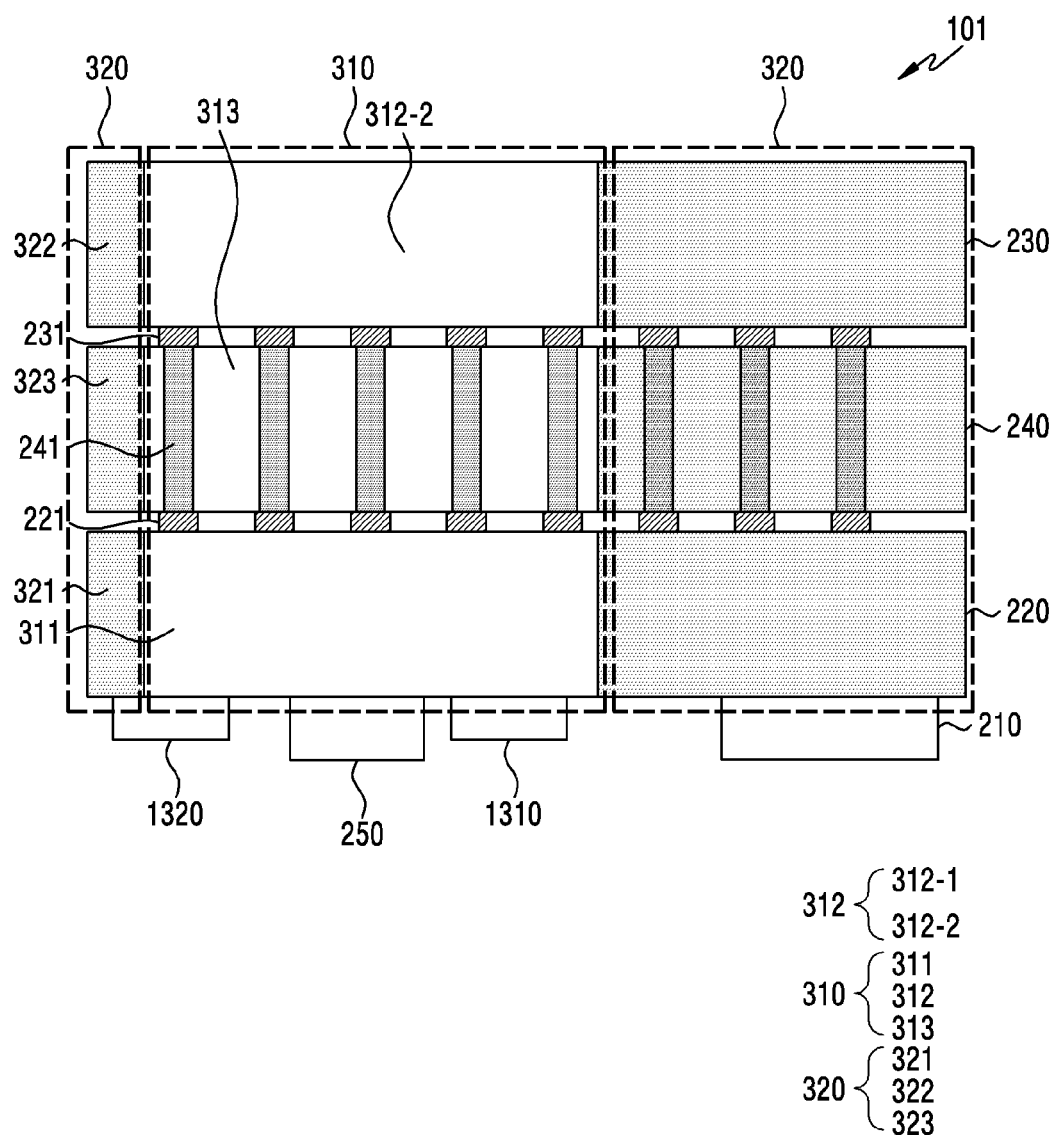
FIG. 14 is a cross-sectional view of a PBA included in an electronic device according to various embodiments.

FIG. 13 is a cross-sectional view of a PBA 101 included in an electronic device 100 according to various embodiments. FIG. 14 is a cross-sectional view of a PBA 101 included in an electronic device 100 according to various embodiments.

In an example, FIGS. 13 and 14 may be understood as cross-sections taken along line B-B' in FIG. 12.

Referring to FIGS. 13 and 14, a PBA 101 may include a wireless communication circuit (or communication circuit) 210, a first PCB 220, a second PCB 230, an interposer 240, a conductive connection member 250, a first matching component 1310, and/or a second matching component 1320.

According to an embodiment, a first space 310 provided in at least a portion of an area where the first PCB 220, the second PCB 230, and the interposer 240 overlap may include a first area 311 of the first PCB 220, a second area 312 of the second PCB 230, and a first portion 313 of the interposer 240. In an example, the second area 312 of the second PCB 230 may include a partial area 312-1 of the second PCB 230 included in the first space 310. In another example, the second area 312 of the second PCB 230 may include an entire area 312-2 of the second PCB 230 included in the first space 310.

According to an embodiment, a second space 320, which is different from the first space 310 provided in at least a portion of an area where the first PCB 220, the second PCB 230, and the interposer 240 overlap, may include an area 321 of the first PCB 220, an area 322 of the second PCB 230, and a second portion 323 of the interposer 240. In an example, the area 321 of the first PCB 220, the area 322 of the second PCB 230, and the second portion 323 of the interposer 240 may be made of a conductive material.

According to an embodiment, the second area 312 of the second PCB 230 may be made of a non-conductive material. For example, the second area 312 of the second PCB 230 may be provided by fill-cutting at least a portion of the conductive portion provided in the second PCB 230 and filling the fill-cut portion with a non-conductive material.

According to an embodiment, one or more conductive members (e.g., PADs) 221 and 231 may be provided in the first space 310. In an example, the first portion 313 of the interposer 240 may be coupled to the first PCB 220 via the first conductive member 221 and the second PCB 230 via the second conductive member 231.

According to an embodiment, the first conductive member 221 and the second conductive member 231 may include a plurality of conductive materials. For example, the first conductive member 221 and the second conductive member 231 may include lead and gold foil.

According to an embodiment, a conductive via 241 may be provided in at least a portion of the first portion 313 of the interposer 240. In an example, the conductive via 241 may electrically connect the interposer 240 and the first PCB 220 by being electrically connected to the first conductive member 221 in the first portion 313. As another example, the conductive via 241 may electrically connect the interposer 240 and the second PCB 230 by being electrically connected to the second conductive member 231 in the first portion 313.

According to an embodiment, the at least one first conductive member 221 may mechanically connect the interposer 240 and the first PCB 220 within the first space 310. For example, by being attached to the first PCB 220 and the interposer 240, the at least one first conductive member 221 may physically connect the first PCB 220 and the interposer 240, rather than electrically connecting the first PCB 220 and the interposer 240.

According to an embodiment, the at least one second conductive member 231 may mechanically connect the interposer 240 and the second PCB 230 within the first space 310. For example, by being attached to the second PCB 230 and the interposer 240, the at least one second conductive member 231 may physically connect the second PCB 230 and the interposer 240, rather than electrically connecting the second PCB 230 and the interposer 240.

According to an embodiment, the first matching component 1310 may be a power-feeding matching component, and the second matching component 1320 may be a ground-matching component.

Figure 15:
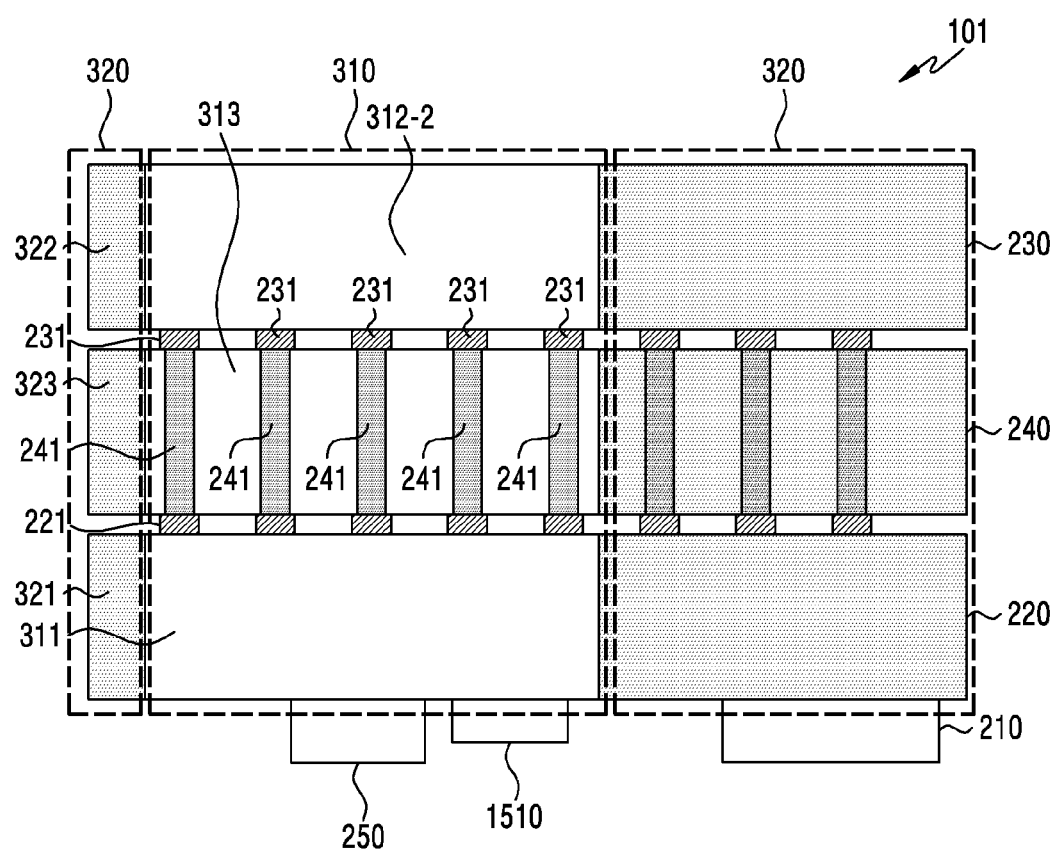
FIG. 15 is a cross-sectional view of a PBA included in an electronic device according to various embodiments.

FIG. 15 is a cross-sectional view of a PBA 101 included in an electronic device 100 according to various embodiments. In an example, FIG. 15 may be understood as a cross section taken along line B-B' of FIG. 12.

Referring to FIG. 15, a PBA 101 may include a wireless communication circuit 210, a first PCB 220, a second PCB 230, an interposer 240, a conductive connection member 250, and/or a power-feeding matching component 1510. In an example, the wireless communication circuit 210, the first PCB 220, the second PCB 230, the interposer 240, and the power-feeding matching component 1510 illustrated in FIG. 15 may be understood as having the same hardware configurations as the wireless communication circuit 210, the first PCB 220, the second PCB 230, the interposer 240, and the first matching component 1310 illustrated in FIG. 14.

According to an embodiment, the PBA 101 may not include a ground matching component (e.g., the second matching component 1320 in FIG. 13 or FIG. 14).

Figure 16:
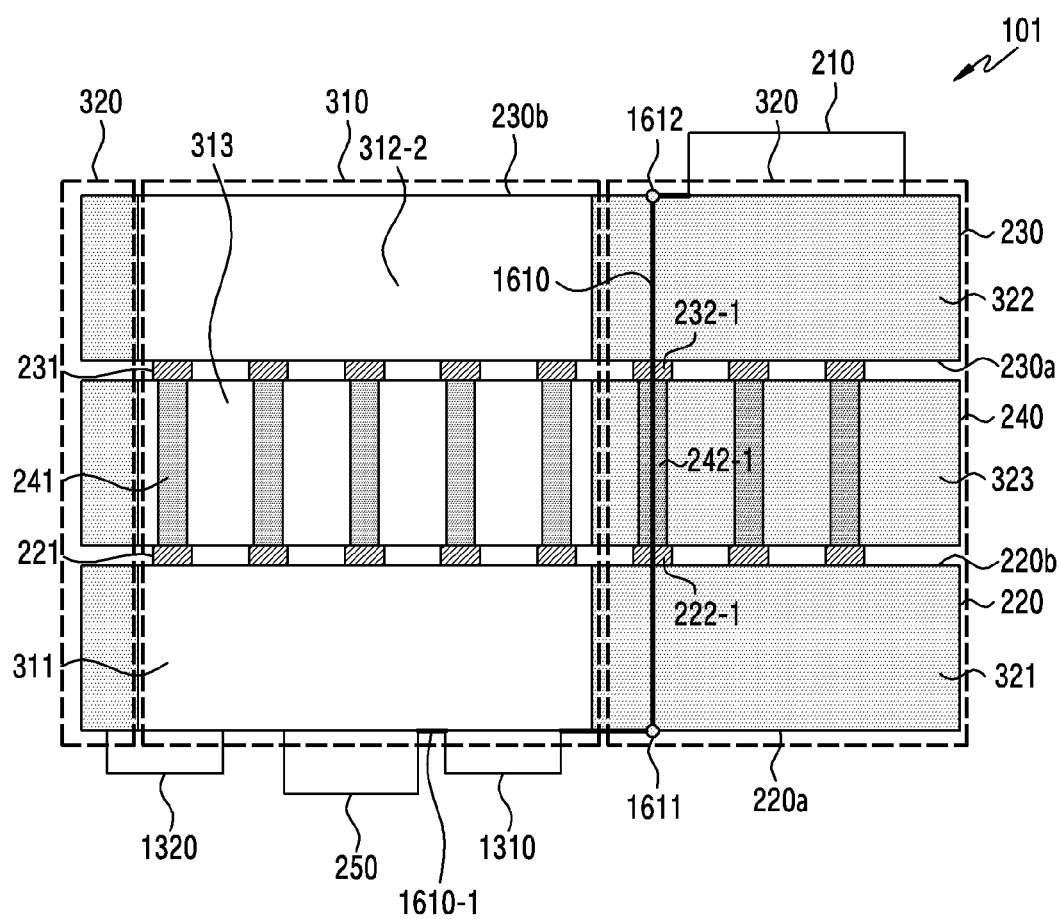
FIG. 16 is a cross-sectional view of a PBA included in an electronic device according to various embodiments.

FIG. 16 is a cross-sectional view of a PBA 101 included in an electronic device 100 according to various embodiments. In an example, FIG. 16 may be understood as a cross section taken along line B-B' of FIG. 12.

Referring to FIG. 16, a PBA 101 may include a wireless communication circuit (or communication circuit) 210, a first PCB 220, a second PCB 230, an interposer 240, a conductive connection member 250, a first matching component 1310, and a second matching component 1320. In an example, the first PCB 220, the second PCB 230, the interposer 240, the conductive connection member 250, the first matching component 1310, and the second matching component 1320 illustrated in FIG. 16 may be understood as having configurations corresponding to respective configurations of those illustrated in FIG. 14.

According to an embodiment, the wireless communication circuit 210 may be disposed on a second surface 230b of the second PCB 230. In an example, the wireless communication circuit 210 may be disposed in an area 322 of the second PCB 230 overlapping the second space 320.

According to an embodiment, a power feeding path 1610 may be provided in at least a portion of the second space 320. In an example, the power feeding path 1610 may extend to a second point 1612 of the second PCB 230 from a first point 1611 of the first PCB 220 via a third conductive member 222-1, a second conductive via 242-1, and a fourth conductive member 232-1.

According to an embodiment, the conductive connection member 250 may be electrically connected to the wireless communication circuit 210 via the first matching component 1310 electrically connected via a first path 1610-1, and via the power feeding path 1610. In an example, the wireless communication circuit 210 may feed power to the conductive connection member 250 via the power feeding path 1610.

According to an embodiment, the first matching component 1310 may perform impedance tuning when the wireless communication circuit 210 feeds power to the conductive connection member 250.

Figure 17:
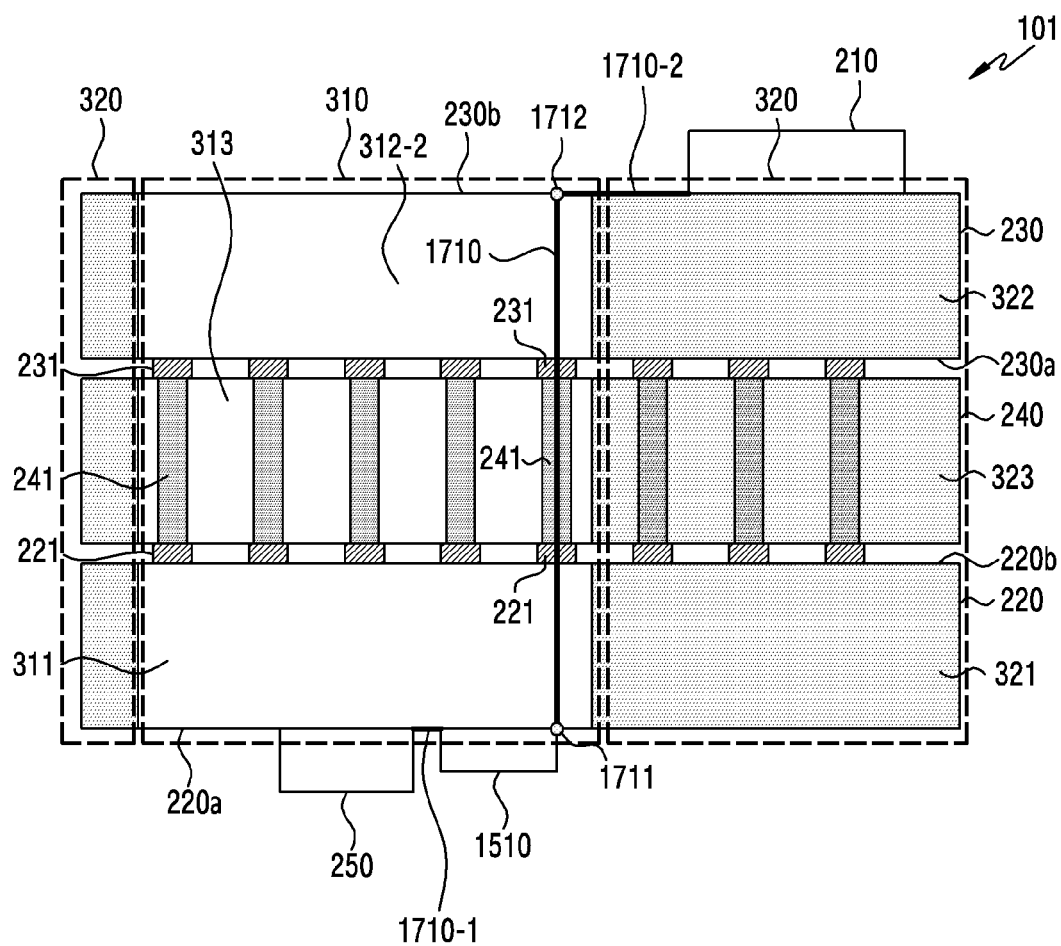
FIG. 17 is a cross-sectional view of a PBA included in an electronic device according to various embodiments.

FIG. 17 is a cross-sectional view of a PBA 101 included in an electronic device 100 according to various embodiments. In an example, FIG. 17 may be understood as a cross section taken along line B-B' of FIG. 12.

Referring to FIG. 17, a PBA 101 may include a wireless communication circuit 210, a first PCB 220, a second PCB 230, an interposer 240, a conductive connection member 250, and/or a power-feeding matching component 1510. In an example, the first PCB 220, the second PCB 230, the interposer 240, the conductive connection member 250, and the power-feeding matching component 1510 illustrated in FIG. 17 may be understood as having the same configurations as respective configurations of those illustrated in FIG. 15.

According to an embodiment, the wireless communication circuit 210 may be disposed on a second surface 230b of the second PCB 230. In an example, the wireless communication circuit 210 may be disposed in an area 322 of the second PCB 230 overlapping the second space 320.

According to an embodiment, the power feeding path 1710 may be provided in at least a portion of the first space 310. In an example, the power feeding path 1710 may be connected to a point 1712 of the second PCB 220 from a first point 1711 of the first PCB 220 via a first conductive member 221, a conductive via (or a first conductive via) 241, and a second conductive member 231.

According to an embodiment, the conductive connection member 250 may be electrically connected to the wireless communication circuit 210 via the power-feeding matching component 1510 electrically connected via a first path 1710-1, and via the power feeding path 1710 and the second path 1710-2. In an example, the wireless communication circuit 210 may feed power to the conductive connection member 250 via the power feeding path 1710 provided in the first space 310.

According to an embodiment, the power-feeding matching component 1510 may perform impedance matching when the wireless communication circuit 210 feeds power to the conductive connection member 250.

Figure 18:
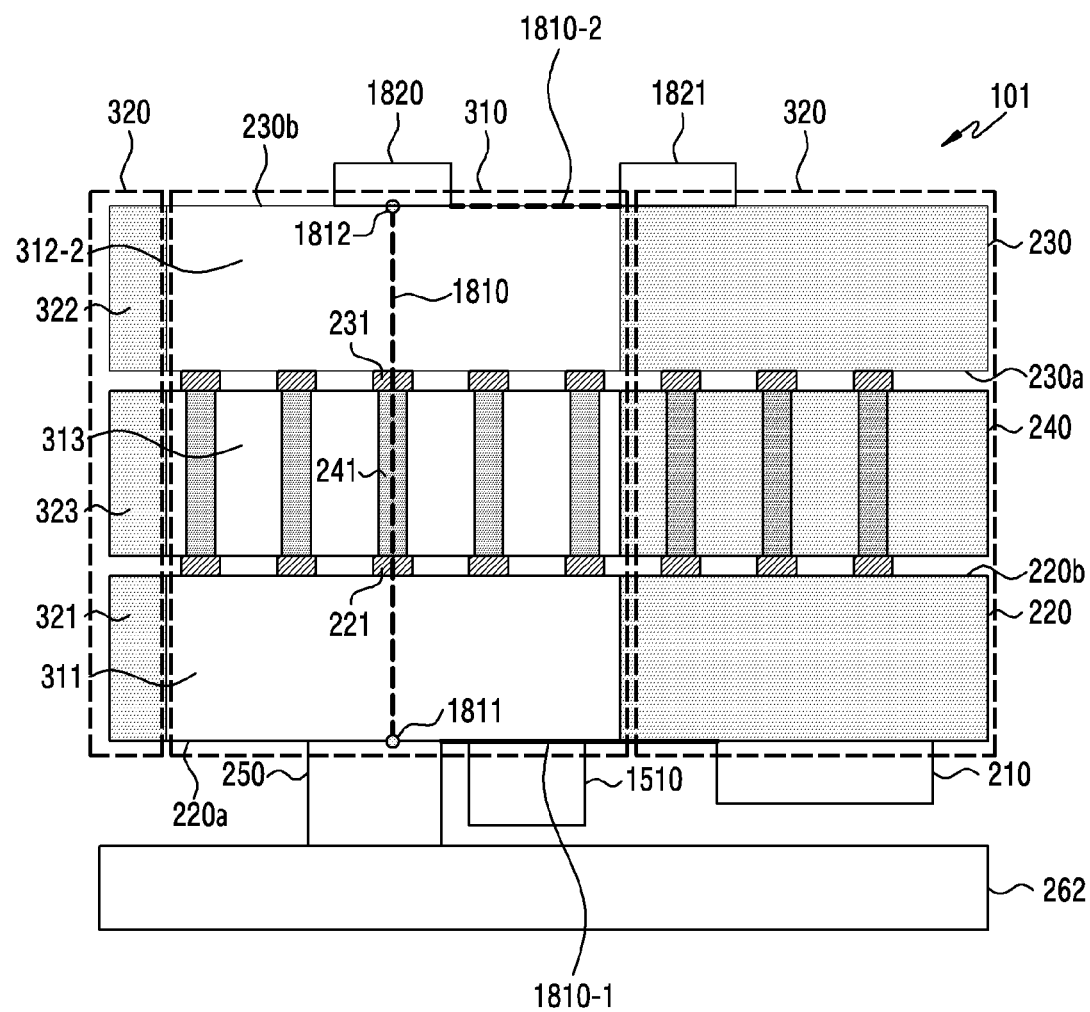
FIG. 18 is a cross-sectional view of a PBA included in an electronic device according to various embodiments.

FIG. 18 is a cross-sectional view of a PBA 101 included in an electronic device 100 according to various embodiments. In an example, FIG. 18 may be understood as a cross section taken along line B-B' of FIG. 12.

Referring to FIG. 18, a PBA 101 may include a wireless communication circuit 210, a first PCB 220, a second PCB 230, an interposer 240, a conductive connection member 250, a power-feeding matching component 1510, a ground matching component 1820, a ground area 1821, and/or a second antenna 262. In an example, the at least one antenna 260 may include a second antenna 262.

According to an embodiment, a ground path 1810 may be provided in at least a portion of the first space 310. In an example, the ground path 1810 may be connected to a second point 1812 of a second surface 230b of the second PCB 230 from a first point 1811 of a first surface 220a of the first PCB 220 via a first conductive member 221, a conductive via (or first conductive via) 241, and a second conductive member 231.

According to an embodiment, the wireless communication circuit 210 may be electrically connected to the second antenna 262 via the first path 1810-1 and via the power-feeding matching component 1510 and the conductive connection member 250. In an example, when the wireless communication circuit 210 feeds power to the second antenna 262, the second antenna 262 may operate as an antenna radiator.

According to an embodiment, the second antenna 262 may be electrically connected to a ground area 1821 connected to a second path 1810-2 via the conductive connection member 250, the ground path 1810, and the ground matching component 1820. In an example, the second antenna 262 may be grounded by being electrically connected to the ground area 1821.

Figure 19:
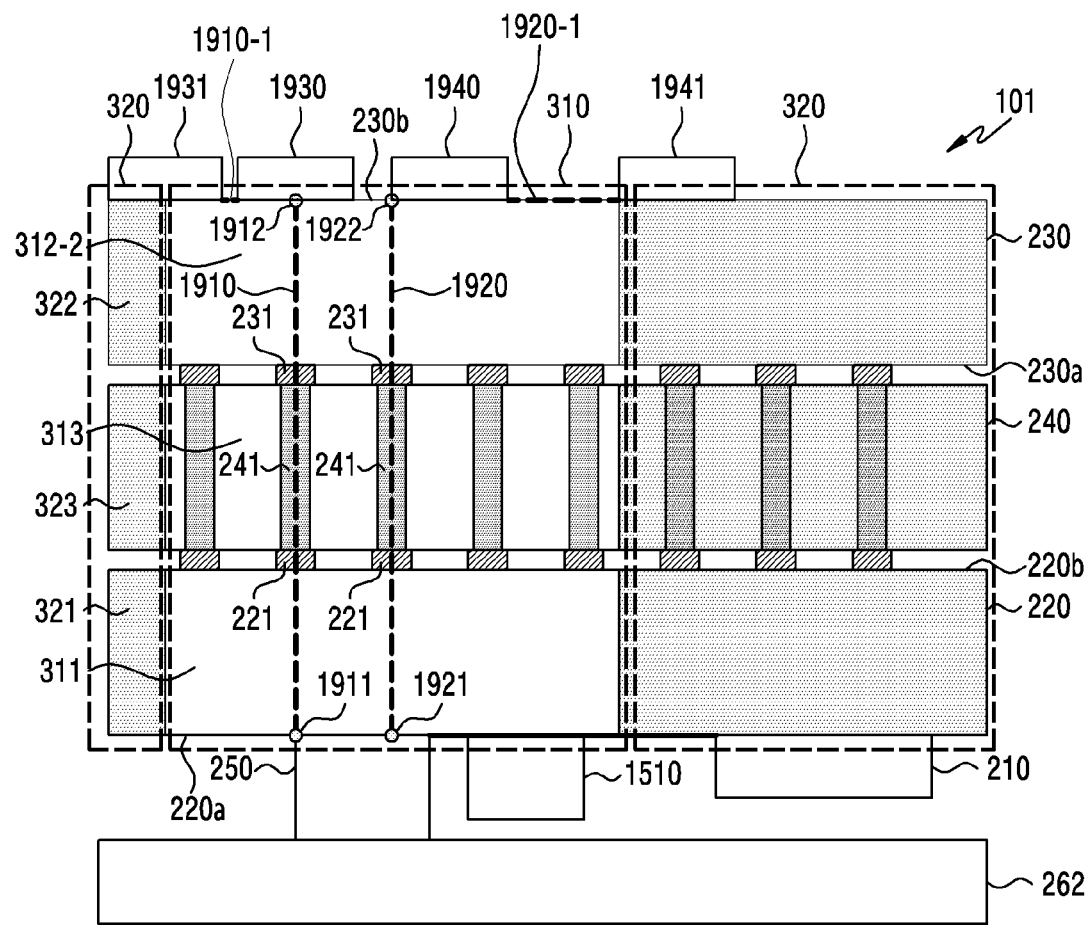
FIG. 19 is a cross-sectional view of a PBA included in an electronic device according to various embodiments.

FIG. 19 is a cross-sectional view of a PBA 101 included in an electronic device 100 according to various embodiments. In an example, FIG. 19 may be understood as a cross section taken along line B-B' of FIG. 12.

Referring to FIG. 19, a PBA 101 may include a wireless communication circuit 210, a first PCB 220, a second PCB 230, an interposer 240, a conductive connection member 250, a power-feeding matching component 1510, a first ground matching compound 1930, a second ground matching component 1940, a first ground area 1931, a second ground area 1941, and/or a second antenna 262.

According to an embodiment, a first ground path 1910 and a second ground path 1920 may be provided in at least a portion of a first space 310. In an example, the first ground path 1910 may be connected to a point 1912 of a second surface 230b of the second PCB 230 from a point 1911 of a first surface 220a of the first PCB 220 via at least one first conductive member 221, at least one conductive via 241, and at least one second conductive member 231. In another example, the second ground path 1920 may be connected to a point 1922 of the second surface 230b of the second PCB 230 from a point 1921 of the first surface 220a of the first PCB 220 via the at least one first conductive member 221, the at least one conductive via 241, and the at least one second conductive member 231.

According to an embodiment, the wireless communication circuit 210 may feed power to the second antenna 262 via the power-feeding matching component 1510 and the conductive connection member 250.

According to an embodiment, the second antenna 262 may be grounded by being electrically connected to the conductive connection member 250 and being electrically connected to one or more ground areas 1931 and 1941 via at least one of the first ground path 1910 or the second ground path 1920. In an example, the second antenna 262 may be grounded by being electrically connected to a first ground area 1931 connected to a first path 1910-1 via the conductive connection member 250, the first ground path 1910, and the first ground matching component 1930. In another example, the second antenna 262 may be grounded by being electrically connected to a second ground area 1941 connected to a second path 1920-1 via the conductive connection member 250, the second ground path 1920, and the second ground matching component 1940.

According to an embodiment, the plurality of ground paths 1910 and 1920 provided in the first space 310 may perform impedance matching tuning by being configured in parallel to each other. In an example, the first ground path 1910 and the second ground path 1920 may be semi-PIFA power feeding paths.

According to an embodiment, the number of ground paths provided in the first space 310 may be three or more. In an example, n ground paths may be provided in the first space 310, and when the wireless communication circuit 210 feeds power to the second antenna 262, impedance tuning may be performed using the n ground paths.

Figure 20:
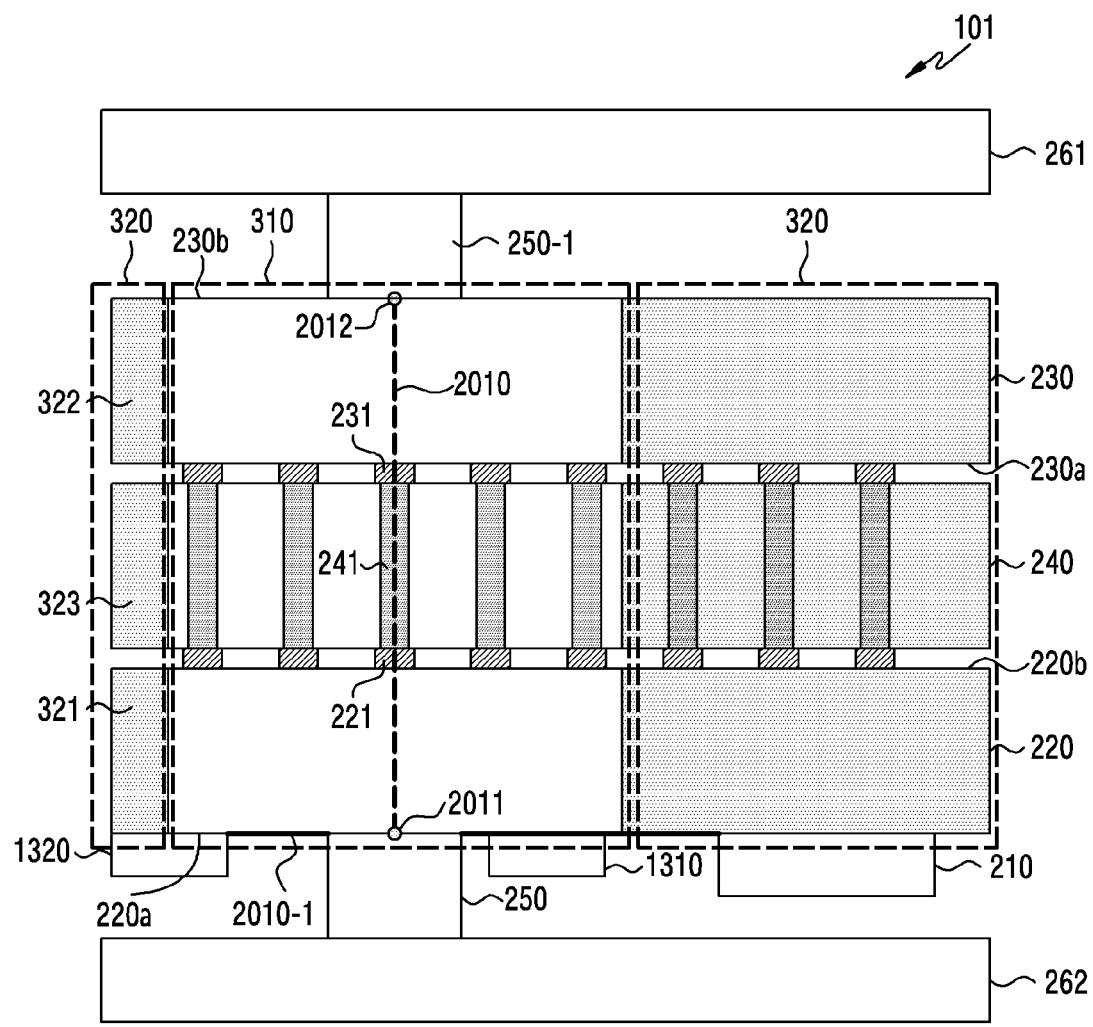
FIG. 20 is a cross-sectional view of a PBA included in an electronic device according to various embodiments.

FIG. 20 is a cross-sectional view of a PBA 101 included in an electronic device 100 according to various embodiments. In an example, FIG. 20 may be understood as a cross section taken along line B-B' of FIG. 12.

Referring to FIG. 20, a PBA 101 may include a wireless communication circuit 210, a first PCB 220, a second PCB 230, an interposer 240, a first matching component 1310, a second matching component 1320, a conductive connection member (or second conductive connection member) 250, a second conductive connection member 250-1, a first antenna 261, and/or a second antenna 262.

According to an embodiment, a power feeding path 2010 may be provided in at least a portion of the first space 310. In an example, the power feeding path 2010 may be connected to a point 2012 of a second surface 230b of the second PCB 230 from a point 2011 of a first surface 220a of the first PCB 220 via at least one first conductive member 221, at least one conductive via 241, and at least one second conductive member 231.

According to an embodiment, the wireless communication circuit 210 may feed power to the second antenna 262 via the first matching component 1310 electrically connected via the first path 2010-1, and the first conductive connection member 250.

According to an embodiment, the wireless communication circuit 210 may feed power to the first antenna 261 via the first matching component 1310, the power feeding path 2010 provided in the first space 310, and the second conductive connection member 250-1.

Figure 21:
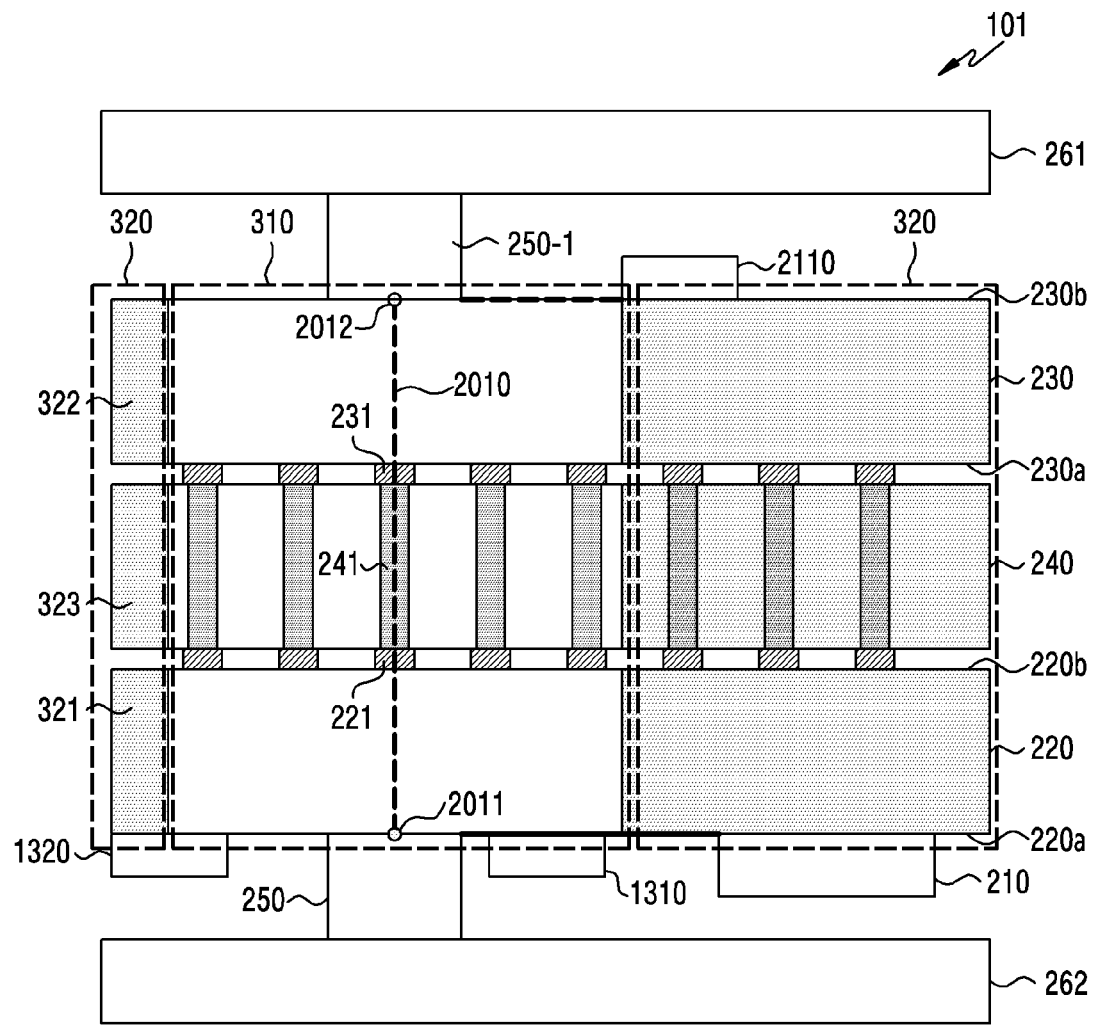
FIG. 21 is a cross-sectional view of a PBA included in an electronic device according to various embodiments.

FIG. 21 is a cross-sectional view of a PBA 101 included in an electronic device 100 according to various embodiments. In an example, FIG. 21 may be understood as a cross section taken along line B-B' of FIG. 12.

Referring to FIG. 21, a PBA 101 may include a wireless communication circuit 210, a first PCB 220, a second PCB 230, an interposer 240, a first matching component 1310, a second matching component 1320, a conductive connection member (or second conductive connection member) 250, a second conductive connection member 250-1, a first antenna 261, a second antenna 262, and/or a third matching component 2110. In an example, the second matching component 1320 and the third matching component 2110 may be ground matching components.

According to an embodiment, a power feeding path 2010 may be provided in at least a portion of the first space 310. In an example, the power feeding path 2010 may be connected to a point 2012 of a second surface 230b of the second PCB 230 from a point 2011 of a first surface 220a of the first PCB 220 via at least one first conductive member 221, at least one conductive via 241, and at least one second conductive member 231.

According to an embodiment, the wireless communication circuit 210 may feed power to the second antenna 262 via the first matching component 1310 and the first conductive connection member 250.

According to an embodiment, the wireless communication circuit 210 may feed power to the first antenna 261 via the first matching component 1310, the power feeding path 2010 provided in the first space 310, and the second conductive connection member 250-1.

According to an embodiment, the first antenna 261 may be electrically connected to the third matching component 2110 via the second conductive connection member 250-1. In an example, when the wireless communication circuit 210 feeds power to the first antenna 261, impedance matching may be performed using the third matching component 2110.

Figure 22:
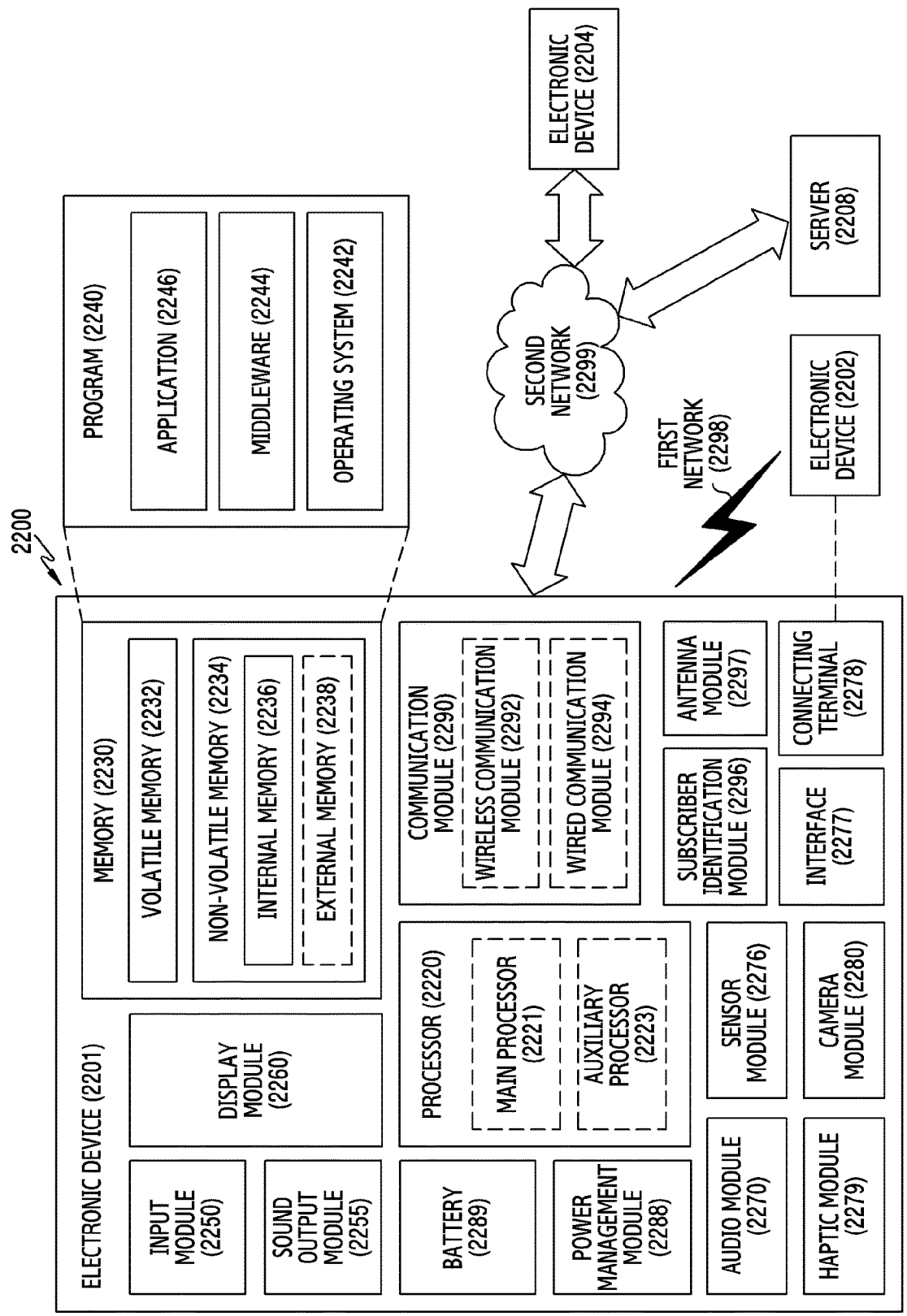
FIG. 22 is a block diagram illustrating an example electronic device in a network environment according to various embodiments.

FIG. 22 is a block diagram illustrating an example electronic device 2201 in a network environment 2200 according to various embodiments. Referring to FIG. 22, the electronic device 2201 in the network environment 2200 may communicate with an electronic device 2202 via a first network 2298 (e.g., a short-range wireless communication network), or at least one of an electronic device 2204 or a server 2208 via a second network 2299 (e.g., a long-range wireless communication network). According to an embodiment, the electronic device 2201 may communicate with the electronic device 2204 via the server 2208. According to an embodiment, the electronic device 2201 may include a processor 2220, memory 2230, an input module 2250, a sound output module 2255, a display module 2260, an audio module 2270, a sensor module 2276, an interface 2277, a connecting terminal 2278, a haptic module 2279, a camera module 2280, a power management module 2288, a battery 2289, a communication module 2290, a subscriber identification module (SIM) 2296, and/or an antenna module 2297. In various embodiments, at least one of the components (e.g., the connecting terminal 2278) may be omitted from the electronic device 2201, or one or more other components may be added in the electronic device 2201. In various embodiments, some of the components (e.g., the sensor module 2276, the camera module 2280, or the antenna module 2297) may be implemented as a single component (e.g., the display module 2260).

The processor 2220 may execute, for example, software (e.g., a program 2240) to control at least one other component (e.g., a hardware or software component) of the electronic device 2201 coupled with the processor 2220, and may perform various data processing or computation. According to an embodiment, as at least part of the data processing or computation, the processor 2220 may store a command or data received from another component (e.g., the sensor module 2276 or the communication module 2290) in volatile memory 2232, process the command or the data stored in the volatile memory 2232, and store resulting data in non-volatile memory 2234. According to an embodiment, the processor 2220 may include a main processor 2221 (e.g., a central processing unit (CPU) or an application processor (AP)), or an auxiliary processor 2223 (e.g., a graphics processing unit (GPU), a neural processing unit (NPU), an image signal processor (ISP), a sensor hub processor, or a communication processor (CP)) that is operable independently from, or in conjunction with, the main processor 2221. For example, when the electronic device 2201 includes the main processor 2221 and the auxiliary processor 2223, the auxiliary processor 2223 may be adapted to consume less power than the main processor 2221, or to be specific to a specified function. The auxiliary processor 2223 may be implemented as separate from, or as part of the main processor 2221.

The auxiliary processor 2223 may control at least some of functions or states related to at least one component (e.g., the display module 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active state (e.g., executing an application). According to an embodiment, the auxiliary processor 2223 (e.g., an image signal processor or a communication processor) may be implemented as part of another component (e.g., the camera module 2280 or the communication module 2290) functionally related to the auxiliary processor 2223. According to an embodiment, the auxiliary processor 2223 (e.g., the neural processing unit) may include a hardware structure specified for artificial intelligence model processing. An artificial intelligence model may be generated by machine learning. Such learning may be performed, e.g., by the electronic device 2201 where the artificial intelligence is performed or via a separate server (e.g., the server 2208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2230 may store various data used by at least one component (e.g., the processor 2220 or the sensor module 2276) of the electronic device 2201. The various data may include, for example, software (e.g., the program 2240) and input data or output data for a command related thereto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input module 2250 may receive a command or data to be used by another component (e.g., the processor 2220) of the electronic device 2201, from the outside (e.g., a user) of the electronic device 2201. The input module 2250 may include, for example, a microphone, a mouse, a keyboard, a key (e.g., a button), or a digital pen (e.g., a stylus pen).

The sound output module 2255 may output sound signals to the outside of the electronic device 2201. The sound output module 2255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2260 may visually provide information to the outside (e.g., a user) of the electronic device 2201. The display module 2260 may include, for example, a display, a hologram device, or a projector and control circuitry to control a corresponding one of the display, hologram device, and projector. According to an embodiment, the display module 2260 may include a touch sensor adapted to detect a touch, or a pressure sensor adapted to measure the intensity of force incurred by the touch.

The audio module 2270 may convert a sound into an electrical signal and vice versa. According to an embodiment, the audio module 2270 may obtain the sound via the input module 2250, or output the sound via the sound output module 2255 or a headphone of an external electronic device (e.g., an electronic device 2202) directly (e.g., wiredly) or wirelessly coupled with the electronic device 2201.

The sensor module 2276 may detect an operational state (e.g., power or temperature) of the electronic device 2201 or an environmental state (e.g., a state of a user) external to the electronic device 2201, and then generate an electrical signal or data value corresponding to the detected state. According to an embodiment, the sensor module 2276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device (e.g., the electronic device 2202) directly (e.g., wiredly) or wirelessly. According to an embodiment, the interface 2277 may include, for example, a high definition multimedia interface (HDMI), a universal serial bus (USB) interface, a secure digital (SD) card interface, or an audio interface.

A connecting terminal 2278 may include a connector via which the electronic device 2201 may be physically connected with the external electronic device (e.g., the electronic device 2202). According to an embodiment, the connecting terminal 2278 may include, for example, a HDMI connector, a USB connector, a SD card connector, or an audio connector (e.g., a headphone connector).

The haptic module 2279 may convert an electrical signal into a mechanical stimulus (e.g., a vibration or a movement) or electrical stimulus which may be recognized by a user via his tactile sensation or kinesthetic sensation. According to an embodiment, the haptic module 2279 may include, for example, a motor, a piezoelectric element, or an electric stimulator.

The camera module 2280 may capture a still image or moving images. According to an embodiment, the camera module 2280 may include one or more lenses, image sensors, image signal processors, or flashes.

The power management module 2288 may manage power supplied to the electronic device 2201. According to an embodiment, the power management module 2288 may be implemented as at least part of, for example, a power management integrated circuit (PMIC).

The battery 2289 may supply power to at least one component of the electronic device 2201. According to an embodiment, the battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the application processor (AP)) and supports a direct (e.g., wired) communication or a wireless communication. According to an embodiment, the communication module 2290 may include a wireless communication module 2292 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device via the first network 2298 (e.g., a short-range communication network, such as Bluetooth™ wireless-fidelity (Wi-Fi) direct, or infrared data association (IrDA)) or the second network 2299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2292 may identify and authenticate the electronic device 2201 in a communication network, such as the first network 2298 or the second network 2299, using subscriber information (e.g., international mobile subscriber identity (IMSI)) stored in the subscriber identification module 2296.

The wireless communication module 2292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2292 may support a high-frequency band (e.g., the mmWave band) to achieve, e.g., a high data transmission rate. The wireless communication module 2292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2292 may support various requirements specified in the electronic device 2201, an external electronic device (e.g., the electronic device 2204), or a network system (e.g., the second network 2299). According to an embodiment, the wireless communication module 2292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 2297 may transmit or receive a signal or power to or from the outside (e.g., the external electronic device) of the electronic device 2201. According to an embodiment, the antenna module 2297 may include an antenna including a radiating element including a conductive material or a conductive pattern formed in or on a substrate (e.g., a printed circuit board (PCB)). According to an embodiment, the antenna module 2297 may include a plurality of antennas (e.g., array antennas). In such a case, at least one antenna appropriate for a communication scheme used in the communication network, such as the first network 2298 or the second network 2299, may be selected, for example, by the communication module 2290 (e.g., the wireless communication module 2292) from the plurality of antennas. The signal or the power may then be transmitted or received between the communication module 2290 and the external electronic device via the selected at least one antenna. According to an embodiment, another component (e.g., a radio frequency integrated circuit (RFIC)) other than the radiating element may be additionally formed as part of the antenna module 2297.

According to various embodiments, the antenna module 2297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2201 and the external electronic device 2204 via the server 2208 coupled with the second network 2299. Each of the electronic devices 2202 or 2204 may be a device of a same type as, or a different type, from the electronic device 2201. According to an embodiment, all or some of operations to be executed at the electronic device 2201 may be executed at one or more of the external electronic devices 2202, 2204, or 2208. For example, if the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2201.

The electronic device 2201 may provide the outcome, with or without further processing of the outcome, as at least part of a reply to the request. To that end, a cloud computing, distributed computing, mobile edge computing (MEC), or client-server computing technology may be used, for example. The electronic device 2201 may provide ultra low-latency services using, e.g., distributed computing or mobile edge computing. In an embodiment, the external electronic device 2204 may include an internet-of-things (IoT) device. The server 2208 may be an intelligent server using machine learning and/or a neural network. According to an embodiment, the external electronic device 2204 or the server 2208 may be included in the second network 2299. The electronic device 2201 may be applied to intelligent services (e.g., smart home, smart city, smart car, or healthcare) based on 5G communication technology or IoT-related technology.

An electronic device according to various example embodiments may include: a first printed circuit board (PCB), a second PCB disposed apart from the first PCB, an interposer surrounding a space between the first PCB and the second PCB, an antenna, a conductive connection member comprising a conductive material electrically connecting the second PCB and the antenna, and a wireless communication circuit electrically connected to the first PCB. The interposer may include: a ground portion configured to provide shielding for at least one electronic component disposed in the electronic device, and a non-conductive portion located adjacent to the ground portion and including a dielectric material. The non-conductive portion of the interposer may include a conductive via connecting the first PCB and the second PCB, and the wireless communication circuit may be configured to transmit and/or receive a signal of a specified frequency band by feeding power to the antenna via the conductive via.

According to an example embodiment, a display disposed adjacent to the wireless communication circuit may be further included.

According to an example embodiment, the ground portion may be connected to a plurality of ground balls provided in the interposer.

According to an example embodiment, the conductive connection member may include a first conductive connection member, a second conductive connection member comprising a conductive material may be further included, the first PCB may be connected to the first conductive connection member, and the second PCB may be connected to the second conductive connection member.

According to an example embodiment, the wireless communication circuit may be configured to feed power to the second conductive connection member via the conductive via.

According to an example embodiment, the conductive via may include at least two conductive vias.

According to an example embodiment, the at least two conductive vias may be electrically connected to each other.

According to an example embodiment, the wireless communication circuit may be configured to perform impedance tuning through the at least two conductive vias.

According to an example embodiment, the wireless communication circuit may expand a ground area by electrically connecting the at least two conductive vias.

According to an example embodiment, the conductive via may be electrically connected to the wireless communication circuit via at least two power feeding paths.

According to an example embodiment, the wireless communication circuit may be configured to change an electrical length by changing the at least two power feeding paths connected to the conductive via.

According to an example embodiment, the conductive connection member may include a first conductive connection member, and the wireless communication circuit may be configured to feed power to a side surface portion of the electronic device via a second conductive connection member.

According to an example embodiment, the side surface portion may be configured to operate as an antenna radiator.

According to an example embodiment, the first PCB may include a ground portion configured to provide shielding for the at least one electronic component disposed in the electronic device.

According to an example embodiment, the second PCB may include a ground portion configured to provide shielding for the at least one electronic component disposed in the electronic device.

A printed board assembly (PBA) according to various example embodiments may include: a first printed circuit board (PCB), a second PCB disposed apart from the first PCB, an interposer disposed between a first surface of the first PCB and a second surface of the second PCB, a first portion comprising a non-conductive material, and a second portion comprising a conductive material and being different from the first portion. Conductive vias may be provided in at least a portion of the first portion, and the interposer may be connected to the first PCB via a first conductive member comprising a conductive material in the first portion and may be connected to the second PCB via a second conductive member comprising a conductive material in the first portion. When the second surface of the second PCB is viewed from a third surface of the first PCB, the third surface of the first PCB being a surface opposite to the first surface of the first PCB, all or part of a first area of the first PCB and a second area of the second PCB, corresponding to the first portion of the interposer may comprise a non-conductive material, and at least one conductive connection member electrically connected to at least one antenna may be disposed in at least a portion of the third surface of the first PCB corresponding to the first area of the first PCB.

According to an example embodiment, the first conductive member and the second conductive member may be electrically connected to each other by being in contact with or being coupled to the at least one conductive connection member electrically connected to the at least one antenna.

According to an example embodiment, a wireless communication circuit may be disposed in at least a portion of a fourth surface of the second PCB, opposite to the second surface of the second PCB, and the wireless communication circuit may be configured to feed power to the at least one antenna by being electrically connected to the conductive connection member via the conductive via.

According to an example embodiment, a wireless communication circuit may be disposed in at least a portion of the third surface of the first PCB, the at least one conductive connection member may include a first conductive connection member, and the at least one antenna may comprise a first antenna. A second conductive connection member electrically connected to a second antenna may be disposed in at least a portion of a fourth surface of the second PCB, opposite to the second surface of the second PCB, the first conductive connection member and the second conductive connection member may be electrically connected to each other via the conductive via, and the wireless communication circuit may be configured to feed power to the second antenna by being electrically connected to the first conductive connection member, the conductive via, and the second conductive connection member.

According to an example embodiment, a wireless communication circuit may be disposed in at least a portion of the third surface of the first PCB, at least one matching component may be disposed in at least a portion of the fourth surface of the second PCB, opposite to the second surface of the second PCB, the at least one matching component may be electrically connected to the conductive connection member via the conductive via, and the wireless communication circuit may be configured to perform impedance tuning by being electrically connected to the at least one matching component.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2240) including one or more instructions that are stored in a storage medium (e.g., internal memory 2236 or external memory 2238) that is readable by a machine (e.g., the electronic device 2201). For example, a processor (e.g., the processor 2220) of the machine (e.g., the electronic device 2201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:
1. An electronic device comprising:
a first printed circuit board (PCB);
a second PCB disposed apart from the first PCB;
an interposer included in a space between the first PCB and the second PCB;
an antenna;
a conductive connection member comprising a conductive material electrically connecting the second PCB and the antenna; and a wireless communication circuit electrically connected to the first PCB, wherein the interposer comprises:
- a ground portion configured to provide shielding for at least one electronic component disposed in the electronic device; and
- a non-conductive portion located adjacent to the ground portion and including a dielectric material, wherein the non-conductive portion of the interposer comprises a conductive via connecting the first PCB and the second PCB, wherein the wireless communication circuit is configured to transmit and/or receive a signal of a specified frequency band by feeding power to the antenna via the conductive via, and wherein the conductive via comprises at least two conductive vias being electrically connected to each other, and wherein the wireless communication circuit is configured to perform impedance tuning through the at least two conductive vias.

2. The electronic device of claim 1, further comprising a display disposed adjacent to the wireless communication circuit.

3. The electronic device of claim 1, wherein the ground portion is connected to a plurality of ground balls provided in the interposer.

4. The electronic device of claim 1, wherein the conductive connection member includes a second conductive connection member,
wherein the electronic device further comprises a first conductive connection member comprising a conductive material, and
wherein the first PCB is connected to the first conductive connection member, and
wherein the second PCB is connected to the second conductive connection member.

5. The electronic device of claim 4, wherein the wireless communication circuit is configured to feed power to the second conductive connection member via the conductive via.

6. The electronic device of claim 1, wherein the wireless communication circuit is configured to expand a ground area by electrically connecting the at least two conductive vias.

7. The electronic device of claim 1, wherein the conductive via is electrically connected to the wireless communication circuit via at least two power feeding paths.

8. The electronic device of claim 7, wherein the wireless communication circuit is configured to change an electrical length by changing the at least two power feeding paths connected to the conductive via.

9. The electronic device of claim 1, wherein the conductive connection member includes a first conductive connection member, and
wherein the wireless communication circuit is configured to feed power to a side surface portion of the electronic device via a second conductive connection member.

10. The electronic device of claim 9, wherein the side surface portion is configured to operate as an antenna radiator.

11. The electronic device of claim 1, wherein the first PCB comprises a ground portion configured to provide shielding for the at least one electronic component disposed in the electronic device.

12. The electronic device of claim 1, wherein the second PCB comprises a ground portion configured to provide shielding for the at least one electronic component disposed in the electronic device.

* * * * *